United States Patent
Nishikawa et al.

(10) Patent No.: US 6,771,009 B2
(45) Date of Patent: Aug. 3, 2004

(54) SPARK PLUG

(75) Inventors: Kenichi Nishikawa, Bisai (JP); Yoshihide Kouge, Kagoshima (JP); Makoto Sugimoto, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 256 days.

(21) Appl. No.: 09/964,892

(22) Filed: Sep. 28, 2001

(65) Prior Publication Data

US 2002/0041137 A1 Apr. 11, 2002

(30) Foreign Application Priority Data

Sep. 29, 2000 (JP) .................................... P.2000-299379
Jun. 27, 2001 (JP) .................................... P.2001-195247

(51) Int. Cl.$^7$ ............................................. H01T 13/00
(52) U.S. Cl. ....................................................... 313/118
(58) Field of Search ................................ 313/141, 130; 428/220

(56) References Cited

U.S. PATENT DOCUMENTS

| 4,084,976 A |   | 4/1978 | Hinton |   |
|---|---|---|---|---|
| 4,120,733 A |   | 10/1978 | Knapp |   |
| 4,256,497 A |   | 3/1981 | Knapp |   |
| 5,677,250 A | * | 10/1997 | Knapp | .......................... 501/14 |
| 5,859,491 A | * | 1/1999 | Nishikawa et al. | .......... 313/141 |
| 5,922,444 A | * | 7/1999 | Tsuzuki et al. | .............. 428/220 |
| 6,492,289 B1 |   | 12/2002 | Suzuki et al. | .................. 501/14 |

FOREIGN PATENT DOCUMENTS

| EP | 0 959 542 A1 | 11/1999 |
| JP | A-01-221879 | 9/1989 |
| JP | A-10-236845 | 9/1998 |
| JP | 11-106234 | 4/1999 |
| JP | A-2000-313681 | 11/2000 |
| JP | 11-43351 | 2/2001 |
| JP | A-2001-039733 | 2/2001 |

* cited by examiner

*Primary Examiner*—Sandra O'Shea
*Assistant Examiner*—Sumati Krishnan
(74) *Attorney, Agent, or Firm*—Morgan Lewis & Bockius LLP

(57) ABSTRACT

A resistor-containing spark plug 100 has an alumina insulator 2 coated with a glaze layer 2d, the glaze layer 2d has a lead component content of 1 mol % or lower in terms of PbO and containing a silicon component, a boron component, a zinc and/or alkaline earth metal component, and an alkali metal component. The insulator has, in an axially central position thereof, a projection part protruding from the outer circumferential surface thereof and extending in a circumferential direction. That main body of the insulator which is located adjacent to the projection part on the rear side thereof, which is the side opposite to the front side facing the center electrode in the axial direction, has a base portion having a cylindrical outer circumference. The outer circumference of the base portion is covered with the glaze layer which, when examined by the method as provided for in JIS B 0601, gives a surface roughness curve having a maximum height Ry of 10 μm or smaller.

11 Claims, 5 Drawing Sheets

SPARK PLUG

BACKGROUND OF THE INVENTION

1. Field of the Invention

The present invention relates to spark plugs.

2. Description of the Related Art

Spark plugs used for ignition in internal-combustion engines including automobile engines generally comprise a metal shell to which a ground electrode is fixed, an insulator made of an alumina ceramic or the like, and a center electrode disposed inside the insulator. The insulator projects from the rear opening of the metal shell in the axial direction. A terminal metal fixture is disposed in the projecting part of the insulator and is connected to the center electrode via a conductive glass seal layer, resistor, etc. formed by a glass sealing step. A high voltage is applied to the terminal metal fixture to cause a spark over the gap between the ground electrode and the center electrode.

However, a combination of factors such as, e.g., an elevated spark plug temperature and an increased ambient humidity may cause the so-called flashover phenomenon in which high-voltage application results not in a spark over the gap but in a current flow on the surface of a projecting part of the insulator to cause a discharge between the terminal metal fixture and the metal shell. Primarily for the purpose of avoiding this flashover phenomenon, most of the spark plugs for general use have a glaze layer on the surface of the insulator. The glaze layer serves also to smoothen the insulator surface and thereby prevent contamination and to enhance the chemical durability or mechanical strength of the insulator.

In the case of the alumina insulator for use in spark plugs, a lead silicate glass glaze has conventionally been used which is obtained by incorporating a relatively large amount of PbO into a silicate glass to lower the softening point thereof. This glaze is described, e.g., in JP-A-8-279099. (The term "JP-A" as used herein means an "unexamined published Japanese patent application".) However, the lead-containing glaze layer has a drawback that since the lead changes into $Pb_3O_4$ or $Pb_2O_3$ upon application of a high voltage, the insulation resistance of the glaze layer rapidly decreases and, hence, the glaze layer deteriorates in anti-flashover voltage. In addition, because of the increasing global concern about environmental conservation in recent years, glazes containing lead have gradually come to lose their acceptance. In the automobile industry, for example, where spark plugs are used in a large amount, investigations are being made with the aim of phasing out spark plugs with a lead-containing glaze layer in the future, in view of influences of waste spark plugs on the environment.

Leadless glazes such as borosilicate glasses and alkali borosilicate glasses have conventionally been studied as substitutes for the lead-containing glazes. However, these leadless glazes inevitably have drawbacks such as a high softening point and insufficient insulation resistance. Glazes for spark plugs have come to be required to have an insulating performance durable in severer environments, because the glaze layers on spark plugs are apt to heat up to higher temperatures than on ordinary insulating porcelains due to the conditions under which the spark plugs are used in engines, and because the voltage applied to the spark plugs is becoming higher with the recent trend toward performance advancement in engines. On the other hand, in automobile engines and the like, rubber caps are generally used for connecting the spark plugs to the engine electric equipment system. In this technique, tight contact between the insulator and the inner surface of the rubber cap is important for improving flashover-preventive properties.

SUMMARY OF THE INVENTION

An object of the invention is to provide spark plugs having a glaze layer which has a low lead content, can secure satisfactory tight contact between the insulator of the plug and the inner surface of a rubber cap, and is excellent in insulating property and flashover-preventive property.

Figure 1:
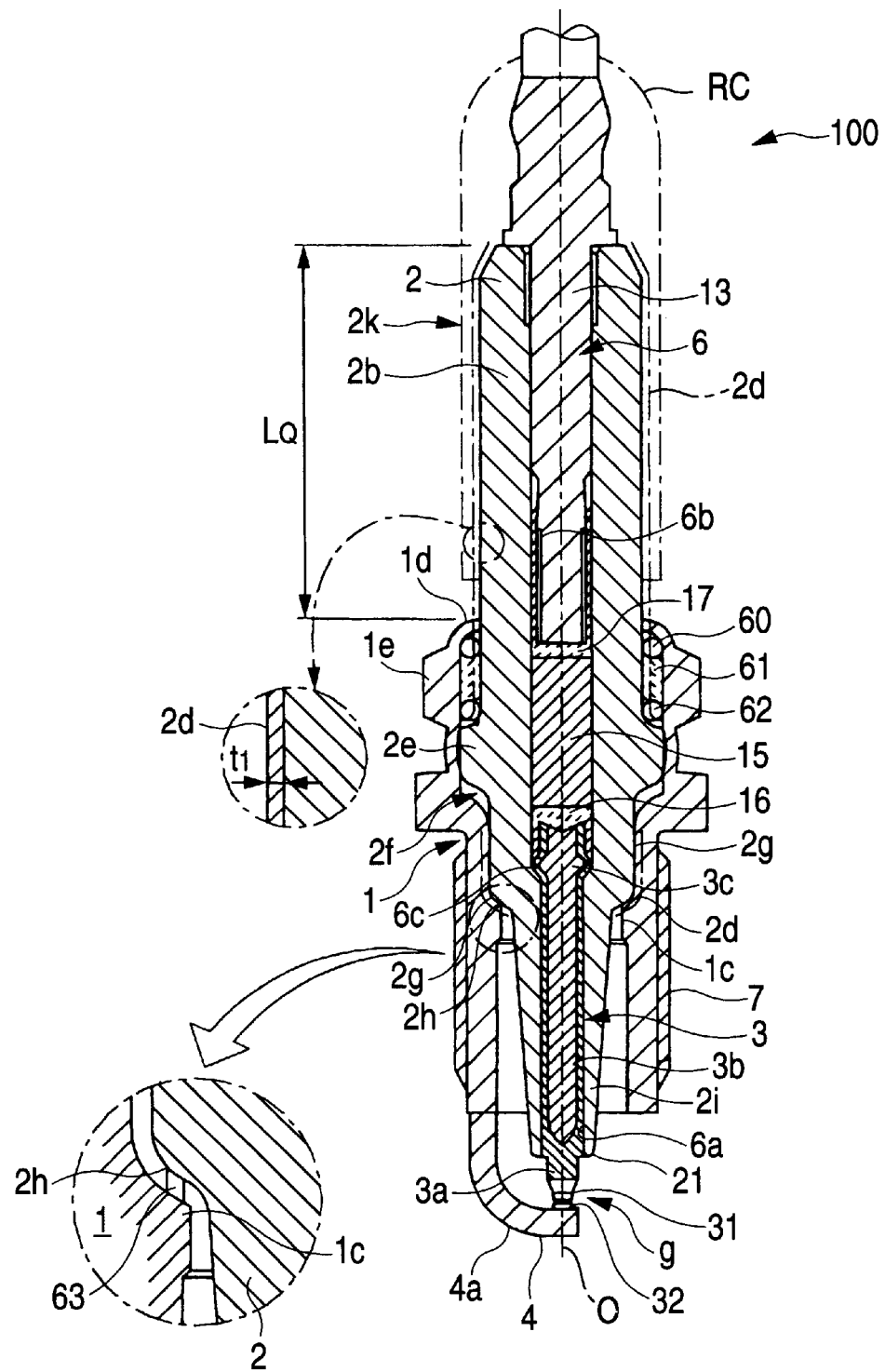
FIG. 1 is a longitudinal sectional view illustrating one embodiment of the spark plugs according to the invention.

The reference numerals used in the drawings are shown below.

- 1: metal shell
- 2: insulator
- 2d: glaze layer
- 3: center electrode
- 4: ground electrode

DETAILED DESCRIPTION OF THE INVENTION

The invention provides spark plugs which each comprise a center electrode, a metal shell, and disposed between the electrode and the shell an insulator comprising an alumina ceramic, wherein at least part of the surface of the insulator is covered with a glaze layer.

In the spark plug according to a first aspect of the invention, the glaze layer has a lead component content of 1 mol % or lower in terms of PbO, the glaze layer comprises from 35 to 80 mol % first ingredient comprising from 5 to 60 mol % silicon component in terms of $SiO_2$ and from 3 to 50 mol % boron component in terms of $B_2O_3$ and from 12 to 60 mol % second ingredient comprising at least one of a zinc component and an alkaline earth metal component R (wherein R is one or more members selected from the group consisting of calcium, strontium, and barium) in terms of ZnO and empirical formula RO, respectively, the total content of the first ingredient and the second ingredient being from 65 to 98 mol %, the total content of the zinc component in terms of ZnO and the barium component in terms of BaO and/or strontium component in terms of SrO being from 12 to 30 mol %, the glaze layer further contains at least one alkali metal component selected from the group consisting of sodium, potassium, and lithium in a total amount of from 2 to 15 mol % in terms of $Na_2O$, $K_2O$, and $Li_2O$, respectively, the insulator has, in an axially central position thereof, a projection part protruding from the outer circumferential surface thereof and extending in a circumferential direction, the main body of the insulator which is located adjacent to the projection part on the rear side thereof, which is the side opposite to the front side facing the center electrode in the axial direction, has a base portion having a cylindrical outer circumference, and the outer circumference of the base portion is covered with the glaze layer which, when examined by the method as provided for in JIS B 0601, gives a surface roughness curve having a maximum height Ry of 10 µm or smaller. In the spark plug according to a second aspect of the invention, the glaze layer has a lead component content of 1 mol % or lower in terms of PbO, the glaze layer comprises from 35 to 80 mol % first ingredient comprising from 5 to 60 mol % silicon component in terms of $SiO_2$ and from 3 to 50 mol % boron component in terms of $B_2O_3$ and from 10 to 60 mol % second ingredient comprising at least one of a zinc component and an alkaline earth metal component R (wherein R is one or more members selected from the group consisting of calcium, strontium, and barium) in terms of ZnO and empirical formula RO, respectively, the total content of the first ingredient and the second ingredient being from 65 to 98 mol %, the total content of the zinc component in terms of ZnO and the barium component in terms of BaO and/or strontium component in terms of SrO being from 10 to 30 mol %, the glaze layer further contains at least one of bismuth and antimony as a fluidity-improving ingredient in a total amount of from 0.5 to 5 mol % in terms of $Bi_2O_3$ and $Sb_2O_3$, respectively, the glaze layer furthermore contains at least one alkali metal component selected from the group consisting of sodium, potassium, and lithium in a total amount of from 2 to 15 mol % in terms of $Na_2O$, $K_2O$, and $Li_2O$, respectively, the insulator has, in an axially central position thereof, a projection part protruding from the outer circumferential surface thereof and extending in a circumferential direction, the main body of the insulator which is located adjacent to the projection part on the rear side thereof, which is the side opposite to the front side facing the center electrode in the axial direction, has a base portion having a cylindrical outer circumference, and the outer circumference of the base portion is covered with the glaze layer which, when examined by the method as provided for in JIS P 0601, gives a surface roughness curve having a maximum height Ry of 10 µm or smaller.

In the spark plugs of the invention described above, it is prerequisite that the glaze layer used should have a lead component content of 1 mol % or lower in terms of PbO (hereinafter, glaze layers having a lead component content reduced to that level will be referred to as "leadless glazes") When a glaze layer contains lead in the form of ions having a lower valency (e.g., $Pb^{2+}$), there are cases where the lead is oxidized to ions having a higher valency (e.g., $Pb^{3+}$) by a corona discharge or the like. As stated above, this oxidation reduces the insulating properties of the glaze layer and impairs the flashover-preventive properties thereof. Also from the standpoint of avoiding the environmental problem described above, that reduction in lead content is beneficial. The lead content in the glaze layer is preferably 0.1 mol % or lower, more preferably substantially zero (provided that the lead which has unavoidably come into the glaze layer frog, e.g., raw materials for the glaze is excluded).

Besides having a reduced lead content as described above, the glaze layer in the invention not only has a smooth surface so as to attain improved tightness of contact with a rubber cap but has a composition according to either of the first and second aspects of the invention described above so as to secure an insulating performance. In addition, that part of the glaze layer which overlies the outer circumference of the base portion of the insulator main body has been regulated in surface roughness so as to have a maximum height Ry of 10 µm or smaller.

In automobile engines and the like, the generally employed technique for connecting the spark plugs to the engine electric equipment system is to use rubber caps. As stated above, tight contact between the insulator and the inner surface of the rubber cap is important for improving flashover-preventive properties. As a result of intensive investigations made by the present inventors, it was found that in leadless glaze layers such as borosilicate glass and alkali borosilicate glass glaze layers, an important factor which influences the attainment of a baked glaze layer surface showing satisfactory tight contact with a rubber cap is the surface roughness of the glaze layer. The outer circumference of the base portion of the insulator main body is especially required to show tight contact with a rubber cap. It was found that if that part of the glaze layer which overlies the base portion of the insulator main body is not properly regulated in surface roughness, sufficient flashover-preventive properties cannot be secured. In the spark plugs of the invention, the insulator has a leadless glaze layer which has either of the compositions described above and which, in its part overlying the outer circumference of the base portion of the insulator main body, has a surface roughness regulated to a value within the range specified above. Due to this constitution, the surface of the baked glaze layer can show a higher degree of tight contact with a rubber cap while maintaining the intact insulating properties of the glaze layer, whereby flashover-preventive properties can be improved.

If that part of the baked glaze layer which overlies the base portion of the insulator main body has a maximum height Ry larger than 10 µm as determined from a surface roughness curve thereof, then the leadless glaze layer, which has either of the compositions described above, does not have an even smooth surface and is hence impaired in the tightness of contact between the surface thereof and a rubber cap. As a result, the glaze layer has insufficient flashover-preventive properties. Smaller values of maximum height Ry are preferred from the standpoint of tight contact, i.e., flashover-preventive properties. However, since an excessive reduction of Ry may lead to an increased production cost, the maximum height Ry is regulated to a value which does not cause such a disadvantage (e.g., Ry≧0.5 µm). The more preferred range of the maximum height Ry is from 1 to 4 µm. Values of Ry were determined in accordance with JIS S 0601 (1994) in the following manner. A roughness curve is obtained through an examination over a given evaluation length, and a section having a sampling length and extending in the direction of the mean line is taken out therefrom. The distance between the peak line and the valley line in the depth direction in this section is measured, and this found value in terms of micrometer (µm) is taken as the maximum height Ry. Selection of the evaluation length and sampling length is provided for in JIS B 0601 (1994), 4.1.3.

From the standpoint of facilitating the formation of a glaze layer which has a maximum surface roughness height Ry of 10 µm or smaller in its area overlying the base portion of the insulator main body, it is desirable that the underlying insulator main body should have been regulated so as to have a maximum surface roughness height Ry of from 15 to 35 μm. If the insulator main body has an Ry exceeding 35 μm, it is difficult to form a glaze layer having a maximum height Ry of 10 μm or smaller. On the other hand, regulation of the Ry of the insulator main body to below 15 μm is disadvantageous in that this necessitates a precision polishing step, leading to an increase in the number of steps and an increased cost. The surface roughness of an insulator main body can be determined by examining the insulator surface by the aforementioned method according to JIS before glazing. However, even after glazing, the surface roughness of the insulator itself can be estimated by processing an image of an axis-containing section of the glazed insulator to determine the boundary line between the glaze layer and the insulator and substituting this boundary line for the profile for roughness examination.

The insulator main body preferably has no corrugations on the outer circumstance in a rear end part thereof. If the rear end part of the insulator main body has corrugations, i e., alternating ridges and grooves, attachment of a rubber cap thereto tends to leave a gap between the insulator surface and the rubber cap. Namely, the tightness of contact between the rubber cap and the surface of the baked glaze layer tends to be reduced, leading to a decrease in flashover-preventive property.

The thickness of the glaze layer covering the outer circumference of the base portion of the insulator main body is preferably from 10 to 50 μm. As a result of intensive studies made by the present inventors, it was further found that in leadless glaze layers such as aluminosilicate glass and alkali borosilicate glass glaze layers, the regulation of glaze layer thickness is important for obtaining a smooth glaze layer surface The outer circumference of the base portion of the insulator main body is especially required to show tight contact with a rubber cap. It was found that flashover-preventive properties and other properties can be improved by properly regulating the glaze layer thickness. When the baked glaze layer overlying the outer circumference of the base portion of the insulator main body has a thickness within the range specified above, the surface of the glaze layer can show a higher degree of tight contact with a rubber cap while maintaining the intact insulating properties of the glaze layer, whereby flashover-preventive properties can be improved.

If that part of the baked glaze layer which overlies the base portion of the insulator main body has a thickness smaller than 10 μm, then the leadless glaze layer, which has either of the compositions described above, is less apt to have an even smooth surface (this does not apply in the case where the outer circumference of the base portion of the insulator main body to be covered with the glaze layer can be smoothened by tumbling or the like) . On the other hand, if the thickness of the glaze layer exceeds 50 μm, there are cases where the leadless glaze layer, which has either of the compositions described above, has reduced insulating properties, leading likewise to reduced flashover-preventive properties. Furthermore, formation of such a thick glaze layer has the following drawback. In the case where an insulator which is held vertical is glazed, glaze sagging is apt to occur during the application/drying of a glaze slurry or during glaze baking. As a result, the resultant glaze layer is thicker in lower parts thereof than in upper parts, and this may lead to difficulties in cap attachment. The more preferred range of the thickness of the glaze layer is from 10 to 30 μm.

The glaze layers in the invention can be constituted mainly of oxides The critical meanings of the ranges of component contents in each glaze layer are as follows (the critical meaning of each component content is common to the constitution according to the first aspect of the invention and that according to the second aspect unless otherwise indicated). First, the content of a silicon component in the glaze layer is from 5 to 60 mol % in terms of $SiO_2$. If the $SiO_2$ content is lower than 5 mol %, vitrification is difficult in glaze layer formation and, hence, an even glaze layer cannot be formed On the other hand, if the $SiO_2$ content exceeds 60 mol %, the glaze has so high a softening point that glaze baking is difficult or impossible.

The content of a boron component in the glaze layer is from 3 to 50 mol % in terms of $B_2O$. If the boron component content is lower than 3 mol %, the glaze has so high a softening point that glaze baking is difficult or impossible. On the other hand, if the boron component content exceeds 50 mol %, not only the glaze slurry has insufficient water resistance but also there are cases where the glaze layer has problems such as devitrification, reduced insulating properties, and a difference in the coefficient of thermal expansion between the glaze layer and the underlying insulator.

The total content of the first ingredient and second ingredient, which are the main components of the glaze layer in the invention, is from 65 to 98 mol % in terms of the respective oxides. If the total content thereof exceeds 98 mol %, there are cases where the glaze has too high a softening point to be baked. If the total content thereof is lower than 65 mol %, it is difficult to attain both of insulating properties and the regulation of softening point and thermal expansion coefficient. The preferred range of the total content thereof is from 70 to 95 mol %.

In the constitution according to the first aspect of the invention, the total content of the zinc component and the barium component and/or strontium component should be from 12 to 30 mol % in terms of the respective oxides. If the total content thereof exceeds 30 mol %, the glaze layer suffers turbidity or the like. In spark plug production, visual information for specifying the manufacturer or the like, such as characters, a figure, or a number, is often imparted to the outer surface of the insulator by printing and baking a color glaze or the like. However, there are cases where the printed visual information is difficult to read due to the turbidity or the like. On the other hand, if the total content thereof is lower than 12 mol %, the glaze has too high a softening point and this not only makes glaze baking difficult but can result in an appearance failure. The preferred range of the total content thereof is from 12 to 20 mol %.

In the first aspect of the invention, the total content of the second ingredient, which comprises a zinc component and/or an alkaline earth metal component R (wherein R is one or more members selected from the group consisting of calcium, strontium, and barium), is from 12 to 60 mol % in terms of the total content of ZnO and empirical formula RO, respectively. If the total content of the second ingredient is lower than 12 mol %, there are cases where the glaze has too high a softening point to be baked at a desired temperature. In addition, there are cases where the glaze layer has so high a coefficient of thermal expansion that it tends to develop defects such as crazing. On the other hand, if the total content of the second ingredient exceeds 60 mol %, there are cases where the glaze layer devitrifies or has insufficient insulating properties and impaired flashover-preventive properties.

On the other hand, in the constitution according to the second aspect of the invention, it is essential that the glaze layer should contain bismuth and/or antimony as a fluidity-improving ingredient in a total amount of from 0.5 to 5 mol %. Such fluidity-improving ingredients each enhance the fluidity of the glaze during baking to thereby restrain bubble formation in the glaze layer. The fluidity-improving ingredients further have the effect of preventing substances adherent to the surface of the glaze from becoming abnormal projections by enabling the adherent substances to be embedded in the fluidized glaze during baking. If the total content of the fluidity-improving ingredients in terms of oxides is lower than 0.5 mol %, there are cases where the effect of improving the fluidity of the glaze during baking to facilitate the formation of a smooth glaze layer cannot be fully attained. On the other hand, if the total content thereof exceeds 5 mol %, there are cases where the glaze has so high a softening point that glaze baking is difficult or impossible. Incidentally, there is a possibility that in the future, bismuth might be designated as a substance whose use should be restricted.

If antimony and bismuth are added in an amount exceeding 5 mol %, there are cases where the glaze layer is excessively colored. In spark plug production, visual information for specifying the manufacturer or the like, such as characters, a figure, or a number, is often imparted to the outer surface of the insulator by printing a color glaze. However, there are cases where the printed visual information is difficult to read when the glaze layer has been excessively colored. Another practical problem is that such a color change attributable to a compositional modification of a glaze is regarded by the consumers as "an unreasonable change of the accustomed appearance color" and, because of this reluctance, the product is not smoothly accepted.

In the second aspect of the invention, the total content of the second ingredient, which comprises a zinc component and/or an alkaline earth metal component R (wherein R is one or more members selected from the group consisting of calcium, strontium, and barium), is from 10 to 60 mol % in terms of the total content of ZnO and empirical formula RO, respectively. If the total content of the second ingredient is lower than 10 mol %, there are cases where the glaze has too high a softening point to be baked at a desired temperature. In addition, there are cases where the glaze layer has so high a coefficient of thermal expansion that it tends to develop defects such as crazing. On the other hand, if the total content of the second ingredient exceeds 60 mol %, there are cases where the glaze layer devitrifies or has insufficient insulating properties and impaired flashover-preventive properties.

In the invention, the insulator underlying the glaze layer is constituted of an alumina ceramic which is white. However, from the standpoint of preventing or inhibiting coloration, it is desirable to regulate the composition of the glaze so that the glaze layer, when examined after having been formed on the insulator, has a saturation Cs of from 0 to 6 and a lightness Vs of from 7.5 to 10. This can be accomplished, for example, by regulating the contents of the aforementioned transition metals. If the saturation of the glazed insulator exceeds 6, a distinct hue is apt to be recognized with the naked eye. If the lightness thereof is lower than 7.5, a grayish or blackish tone is apt to be recognized. In either case, the glazed insulator poses a problem that the appearance thereof gives an impression that the insulator clearly has a color. The saturation Cs of the glazed insulator is preferably from 0 to 2, more preferably from 0 to 1, while the lightness Vs thereof is preferably from 8 to 10, more preferably from 9 to 10. In this specification, measurements of lightness Vs and saturation Cs were made by the methods provided for in JIS Z 8722 "Method of Color Measurement", under "4.3 Method for Examination of Reflective Substance" in "4. Method of Spectrometric Color Measurement". In a simplified method, however, lightness and saturation can be determined based on a visual comparison with a standard color chart formed in accordance with JIS Z 8721.

In the constitution according to the second aspect of the invention, necessary fluidity can be sufficiently secured even when the total content of a zinc component and a barium and/or strontium component is slightly low, because of the incorporation of the fluidity-improving ingredients described above in an amount within the given range. As a result, the range of the total content of the zinc, barium, and strontium components can be widened on the lower-limit side. Specifically, the optimum range thereof is from 10 to 30 mol % as shown above.

The barium component and strontium component not only contribute to an improvement in the insulating properties of the glaze layer but are effective in improving strength. If the total content thereof is lower than 0.5 mol %, the glaze layer has reduced insulating properties, leading to impaired flashover-preventive properties. On the other hand, if the total content thereof exceeds 30 mol %, there are cases where the glaze layer has so high a coefficient of thermal expansion that it tends to develop defects such as crazing. In addition, such a glaze layer tends to suffer turbidity or the like. A barium component and a strontium component may be incorporated alone or in combination thereof. From the standpoint of the cost of raw materials, however, it is advantageous to use a barium component, which is less expensive.

In the glaze layer, the barium component and strontium component each may be present in a form other than oxide depending on the raw materials used. For example, use of $BaSO_4$ as a barium source may result in a residual sulfur component in the resultant glaze layer There are cases where this sulfur component, during glaze baking, concentrates in a surface layer of the glaze to lower the surface tension of the molten glaze. Thus, the sulfur component can function to heighten the surface smoothness of the glaze layer to be obtained. The content of a calcium component in terms of CaO is preferably from 0.5 to 10 mol %, which is effective in improving insulating properties.

The alkali metal components in the glaze layer function to lower the softening point of the glaze. The total content of the alkali metal components which are sodium, potassium, and lithium is from 2 to 15 mol % in terms of the total content of $Na_2O$, $K_2O$, and $Li_2O$, respectively. If the total content thereof is lower than 2 mol %, there are cases where the glaze has too high a softening point to be baked. If the total content thereof exceeds 15 mol %, there are cases where the glaze layer has reduced insulating properties and hence impaired flashover-preventive properties. The total content of the alkali metal components is preferably from 3 to 10 mol %.

In inhibiting the glaze layer from having reduced insulating properties, incorporation of two or more alkali metal components selected from sodium, potassium, and lithium is more effective than incorporation of only one of these alkali metal components. As a result, the content of the alkali metal components can be increased without a substantial sacrifice of insulating properties. Thus, the two purposes of securing flashover-preventive properties and lowering the glaze baking temperature can be attained simultaneously. Other alkali metal components can be incorporated as long as the conductivity-reducing effect of the incorporation of a combination of two or more of the aforementioned alkali metal components is not impaired. From the standpoint of inhibiting the insulating properties from decreasing, it is more preferred to regulate the content of each alkali metal component to 5 mol % or lower, and it is most preferred to incorporate all the three components, i.e., sodium, potassium, and lithium.

The glaze layer preferably contains a lithium component as one of the alkali metal components. A lithium component, among the aforementioned alkali metal components, has the effect of lowering the surface tension of the glaze during baking and to thereby improve surface smoothness and diminish surface roughness. It is preferred to incorporate a lithium component as far as possible, for the purposes of producing the effect of the addition of a combination of two or more alkalis on an improvement in insulating property, regulating the coefficient of thermal expansion of the glaze layer, and improving the mechanical strength thereof. The content of a lithium component is preferably regulated to a value within the following range in terms of molar proportion of the respective oxides.

$$0.2 < Li/(Na+K+Li) < 0.5$$

If the proportion of lithium is lower than 0.2, there are cases where the baked glaze layer has so high a coefficient or thermal expansion as compared with the underlying alumina that it tends to develop defects such as crazing, resulting in an insufficient degree of finish of the glaze layer surface. On the other hand, if the proportion of lithium is higher than 0.5, there are cases where the lithium adversely influences the insulating performance of the glaze layer because lithium ions have a relatively high mobility among ions of alkali metals. The more preferred range of the value of Li/ (Na+K+Li) is from 0.3 to 0.45.

Optional requirements for the invention will be described below.

Besides the components described above, an aluminum component may be contained in the glaze layer in the invention in an amount of from 0.5 to 10 mol % in terms of $Al_2O_3$. An aluminum component has the effect of inhibiting the glaze layer from devitrifying. If the amount of the aluminum component added is smaller than the lower limit, the effect thereof is insufficient. If the amount thereof exceeds the upper limit, there are cases where the glaze has so high a softening point that glaze baking is difficult or impossible.

The glaze layer may further contain one or more components selected from molybdenum, iron, tungsten, nickel, cobalt, and manganese in a total amount of from 0.5 to 5 mol % in terms of $MoO_3$, $Fe_2O_3$, $WO_3$, $Ni_3O_4$, $Co_3O_4$, and $MnO_2$, respectively. By the incorporation of such components, the fluidity of the glaze during baking can be greatly enhanced and the glaze can be baked at a relatively low temperature. As a result, a baked glaze layer having excellent insulating properties and a smooth surface can be obtained with greater ease.

If the total content of one or more components selected from molybdenum, iron, tungsten, nickel, cobalt, and manganese (hereinafter referred to as fluidity-improving transition metal ingredients) is lower than 0.5 mol % in terms of oxide amount, the effect of improving fluidity during glaze baking is insufficient and, hence, the effect of giving a smooth glaze layer is insufficient. On the other hand, if the total content thereof exceeds 5 mol %, there are cases where the glaze has so high a softening point that glaze baking is difficult or impossible. Another problem which may be encountered when fluidity-improving transition metal ingredients are contained in an excessively large amount is that the glaze layer assumes an unintended color as in the case with antimony and bismuth described above.

Furthermore, one or more components selected from zirconium, titanium, hafnium, magnesium, tin, and phosphorus can be contained in the glaze layer in a total amount of from 0.5 to 5 mol % in terms of $ZrO_2$, $TiO_2$, $MgO$, $SnO_2$, and $P_2O_5$, respectively. Although these ingredients can be positively incorporated according to various purposes, there are cases where they unavoidably come as impurities (or contaminants) into the glaze layer from raw materials (or clay minerals incorporated during glaze slurry preparation, which will be described later) or from a refractory material or the like used in the melting step.

These ingredients can be suitably incorporated for the purpose of regulating the softening point of the glaze (e.g., $ZrO_2$, $TiO_2$, and $HfO_2$), improving insulating properties (e.g., $ZrO_2$ and $MgO$), color tone regulation, etc. The incorporation of titanium, zirconium, or hafnium is effective in improving water resistance. Zirconium and hafnium components are more effective than a titanium component in improving the water resistance of the glaze. The term "satisfactory water resistance" as used herein for a glaze means such a property of the glaze that when raw materials for the glaze which are, for example, in a powder form are mixed together with a medium, e.g., water, and the resultant glaze slurry is allowed to stand over long, then the glaze slurry is less apt to suffer the viscosity increase caused by the dissolution of components. Due to the improved water resistance, when the glaze slurry is applied to an insulator, the coating thickness can be easily optimized while attaining reduced unevenness in thickness. As a result, the glaze layer formed through baking can be effectively made to have an optimal thickness with reduced thickness unevenness.

In the glaze layer in the spark plugs of the invention, the components described above each are generally present in the form of an oxide. However, there are often cases where the oxide form in which each component is present cannot be directly ascertained, for example, because of the formation of an amorphous glass phase. In this case, the glaze layer is judged to be within the scope of the invention as long as the contents of the constituent elements in terms of oxides thereof are within the respective ranges specified above.

The content of each component in the glaze layer formed on an insulator can be determined by a known method of microanalysis schwas, e.g., EPMA (electron probe microanalysis) or XPS (X-ray photoelectron spectroscopy) In the case of using EPMA, for example, either the wavelength dispersive method or the energy dispersive method may be used for detecting a characteristic X-ray. Alternatively, use may be made of a method in which the glaze layer is separated from the isolator and subjected to chemical analysis or gas analysis to determine the composition thereof.

The spark plugs of the invention, which have the respective glaze layers described above, each have an axially extending terminal meal fixture in the through-hole of the insulator. This terminal metal fixture can be formed so as to be united with the center electrode. Alternatively, it may be formed separately from the center electrode and bonded to the electrode through a conductive binding layer. The insulation resistance of this insulator can be measured by a method in which the whole spark plug is kept at around 500° C. and a voltage is applied between the terminal metal fixture and the main electrode. From the standpoint of securing high-temperature insulation durability to thereby prevent the occurrence of flashovers, etc., the insulation resistance of the insulator is preferably 200 MΩ or higher.

This insulation resistance measurement is conducted, for example, in the following manner. A DC constant-voltage source (eg., source voltage, 1,000 V) is connected to the terminal metal fixture of the spark plug, and the metal shell is grounded. This spark plug is placed in a heating oven, and a voltage is applied thereto while keeping the plug at 500° C. For example, in the case where a resistor for current measurement (having a resistance Rm) is used for measuring the current value Im, the insulation resistance Rx to be measured can be obtained as (VS/Im)-Pm, wherein VS is the applied voltage. The current value Im can be determined, for example, from the output of a differential amplifier which amplifies the potential difference between both ends of the resistor for current measurement.

The insulator can be constituted of an alumina insulating material containing from 85 to 98 mol % aluminum component in terms of $Al_2O_3$. The glaze layer preferably has an average coefficient of thermal expansion of from $50 \times 10^{-7}$/° C. to $85 \times 10^{-7}$/° C. in the temperature range of from 20 to 350° C. If the coefficient of thermal expansion of the glaze layer is lower than the lower limit, there are cases where the glaze layer is apt to have defects such as cracking or partial separation from the insulator. On the other hand, if the coefficient of thermal expansion thereof exceeds the upper limit, the glaze layer is apt to develop defects such as crazing. The more preferred range of the coefficient of thermal expansion of the glaze layer is from $60 \times 10^{-7}$/° C. to $80 \times 10^{-7}$/° C.

The coefficient of thermal expansion of a glaze layer can be estimated in the following manner. Raw materials are mixed together so as to give almost the same composition as the glaze layer, and the mixture is melted to obtain a vitreous glaze bulk body. A sample is cut out of the bulk body and examined by a known dilatometer method or the like. From this found value, the coefficient of thermal expansion of the glaze layer is estimated. It is also possible to use a laser interferometer, an interatomic force microscope, or the like in determining the coefficient of thermal expansion of the glaze layer formed on an insulator.

The spark plugs of the invention can be produced by the following process. This process comprises:

a glaze powder preparation step which comprises mixing raw material powders for a glaze so as to result in a desired composition, melting the mixture by heating at 1,000 to 1,500° C., subsequently rapidly cooling and vitrifying the melt, grinding the resultant glass, and then using the frit to prepare a glaze powder;

a glaze powder deposition step in which the glaze powder is deposited on the surface of an insulator to form a glaze powder deposit layer; and a glaze baking step in which the powder-coated insulator is baked to fuse the glaze powder deposit layer to the insulator surface and thereby form a glaze layer.

Besides oxides (including complex oxides), examples of the raw material powders for the components of the glaze layer include various inorganic powdered materials such as hydroxides, carbonates, chlorides, sulfates, nitrates, and phosphates. These inorganic material powders should be capable of being converted to oxides by heating and melting. The rapid cooling can be accomplished by throwing the melt into water or by a method in which the melt is ejected onto the surface of a cooling roll to rapidly cool the melt and thereby obtain a flaky solid.

The glaze powder, or the frit, can be dispersed into water or a solvent to prepare a glaze slurry. In this case, the glaze slurry is applied to the surface of an insulator and dried to thereby form a glaze slurry coating layer as a glaze powder deposit layer. For applying the glaze slurry to the surface of an insulator can be used a method in which the glaze slurry is sprayed over the insulator surface from a spray nozzle. This method is advantageous in that a glaze powder deposit layer having an even thickness can be formed easily and the deposit thickness can be easily regulated.

A clay mineral and an organic binder can be incorporated into the glaze slurry in appropriate amounts for the purpose of forming a glaze powder deposit layer having enhanced shape retention. As the clay mineral can be used a clay consisting mainly of aluminosilicate hydrates. Examples thereof include those consisting mainly of one or more of allophane, imogolite, hisingerite, smectite, kaolinite, halloysite, montmorillonite, vermiculite, dolomite, and the like (and synthetic clay minerals of these kinds) In view of the oxide components to be incorporated, a clay mineral can be used which consists mainly of $SiO_2$, $Al_2O_3$, and one or more of $Fe_2O_3$, $TiO_2$, CaO, MgO, $Na_2O$, $K_2O$, and the like.

The spark plugs of the invention can comprise an insulator having a through-hole formed in the axial direction thereof, a terminal metal fixture fitted to one end of the through-hole, and a center electrode fitted to the other end. Furthermore, in the through-hole, a conductive sinter member is disposed between the terminal metal fixture and the center electrode. This conductive sinter member, which electrically connects the terminal metal fixture to the center electrode, consists mainly of a mixture of a glass and a conductive material (e.g., consists of a conductive glass seal layer or a resistor). A spark plug of this structure can be produced by a process comprising the following steps.

Assembly Step: An assembly is produced which comprises an insulator having a through-hole, a terminal metal fixture fitted to one end of the through-hole, a center electrode fitted to the other end, and a powder layer comprising a raw material powder for conductive-sinter formation which is interposed between the terminal metal fixture and the center electrode in the through-hole. The raw material powder consists mainly of a glass powder and a conductive material powder.

Glaze Baking Step: A glaze powder deposit layer is formed on the surface of the insulator This assembly is heated at a temperature of from 800 to 950° C. to bake the glaze powder deposit layer and fuse it to the insulator surface and thereby form a glaze layer. Simultaneously with this glaze layer formation, the glass powder in the powder layer is softened.

Pressing Step: The center electrode and terminal metal fixture in the heated assembly are brought closer to each other within the through-hole to press the powder layer between the center electrode and the terminal metal fixture and thereby form a conductive sinter member.

As a result, the conductive sinter member not only electrically connects the terminal metal fixture to the center electrode but also seals the gap between the wall of the through-hole of the insulator and each of the terminal metal fixture and the center electrode. The glaze baking step hence serves also as a glass sealing step. This process is efficient in that glass sealing and glaze baking are performed simultaneously. Furthermore, since the glaze layer thus formed has either of the compositions described above, the glaze baking can be conducted at a temperature as low as from 800 to 950° C. Consequently, the center electrode and the terminal metal fixture are less apt to be oxidized to cause production failures, resulting in an increased yield of spark plug products. It is also possible to conduct the glaze baking step before a glass sealing step is conducted.

The softening point of the glaze is preferably regulated to, e.g., 600 to 700° C. If the softening point of the glaze is higher than 700° C., the glaze baking step, when conducted so as to serve also as a glass sealing step as described above, necessitates a glaze baking temperature as high as 950° C. or above and this accelerates oxidation of the center electrode and the terminal metal fixture. On the other hand, if the softening point thereof is lower than 600° C., the glaze baking temperature should be set at below 800° C. In this case, the glass for use in the conductive sinter member should be one having a low softening point so as to attain a satisfactory glass-sealed state. As a result, when the spark plug product fabricated with these materials is used for a prolonged time period at a relatively high ambient temperature, the glass contained in the conductive sinter member is apt to alter. For example, in the case where the conductive sinter member contains a resistor, the alteration of the glass may lead to deterioration of a performance such as, e.g., life under load. The more preferred range of the softening point of the glaze layer is from 520 to 620° C.

The softening point of the glaze constituting a glaze layer can be determined, for example, in the following manner. The glaze layer is separated from the insulator and subjected to differential thermal analysis with heating. The temperature corresponding to the peak appearing next to the first endothermic peak showing a yield point (i.e., the temperature corresponding to the second endothermic peak) is taken as the softening point of the glaze. Alternatively, the softening point of the glaze can be estimated by analyzing the glaze layer to determine the contents of the components thereof, calculating the composition of the glaze in terms of oxides, compounding raw oxide materials so as to result in almost the same composition as the calculated one, melting and rapidly cooling the mixture to obtain a glass sample, measuring the softening point of the glass sample, and taking this value of softening point as that of the glaze.

Modes for carrying out the invention will be explained below by reference to the embodiments thereof shown in some of the accompanying drawings. FIG. 1 shows an embodiment of the spark plug according to the first aspect of the invention. This spark plug 100 comprises: a cylindrical metal shell 1; an insulator 2 fitted to the inside of the metal shell 1 with its tip 21 projecting from the front end of the metal shell 1; a center electrode 3 disposed inside the insulator 2 so that its ignition part 31 formed at the tip thereof projects from the front end of the insulator 2; and a ground electrode 4 with its one end bonded to the metal shell 1 by welding or the like and the other bent inward such that a side of this end faces the tip of the center electrode 3. The ground electrode 4 has an ignition part 32 which faces the ignition part 31. Thus, a spark gap g is formed between the ignition part 31 and ignition part 32 facing each other.

The metal shell 1, having a cylindrical shape, is made of a metal, e.g., a low-carbon steel. It functions as a housing of the spark plug 100. This metal shell 1 has in its outer circumferential surface a thread part 7 for screwing the spark plug 100 into an engine block (not shown). Symbol 1e denotes a tool mating part which has a hexagonal cross section and with which a tool such as a spanner or wrench is mated in fastening the metal shell 1.

The insulator 2 has a through-hole 6 extending in the axial direction. A terminal metal fixture 13 has been inserted into the through-hole 6 from one end thereof and fixed, while the center electrode 3 has been inserted into the through-hole 6 from the other end thereof and fixed. A resistor 15 is disposed between the terminal metal fixture 13 and the center electrode 3 in the through-hole 6. This resistor 15 is electrically connected at both ends thereof to the center electrode 3 and the terminal metal fixture 13 through conductive glass seal layers 16 and 17, respectively. The resistor 15 and the conductive glass seal layers 16 and 17 constitute a conductive sinter member. The resistor 15 is constituted of a resistor composition obtained by mixing a glass powder with a conductive material powder (and, if desired, with a powder of a ceramic other than glasses) and heating and pressing the mixed powder as a raw material in the glass sealing step which will be described later. This resistor 15 may be omitted to directly bond the terminal metal fixture 13 to the center electrode 3 with one conductive glass seal layer.

The insulator 2, which has the through-hole 6 extending in the direction of the axis thereof for fitting the center electrode 3 thereto, is constituted as a whole of the following insulating material. This insulating material is an alumina ceramic sinter consisting mainly of alumina and having an aluminum component content of from 85 to 98 mol % (preferably from 90 to 98 mol %) in terms of $Al_2O_3$.

Examples of components other than aluminum include the following.

Silicon component: 1.50–5.00 mol % in terms of $SiO_2$;

Calcium component: 1.20–4.00 mol % in terms of $CaO$;

Magnesium component: 0.05–0.17 mol % in terms of $MgO$;

Barium component: 0.15–0.50 mol % in terms of $BaO$; and

Boron component: 0.15–0.50 mol % in terms of $B_2O_3$.

The insulator 2 has, in an axially central position thereof, a projection part 2e protruding outward, e.g., flange-like, from the outer circumference thereof. That part of the insulator 2 which is located on the rear side of the projection part 2e, i.e., on the side opposite to the front side facing the tip of the center electrode 3 (see FIG. 1), is referred to as a rear portion 2b. This rear portion 2b has a smaller diameter than the projection part 2e. On the other hand, that part of the insulator 2 which is located on the front side of the projection part 2e comprises, in this order from the projection side, a first front portion 2g having a smaller diameter than the projection part 2e and a second front portion 2i having a smaller diameter than the first front portion 2g. The rear end part of the rear portion 2b has no corrugations in its periphery, and the whole outer circumference thereof is cylindrical. The outer circumference of the first front portion 2g is nearly cylindrical, while that of the second front portion 2i is tapered toward the tip, i.e., nearly conical.

Figure 2A:
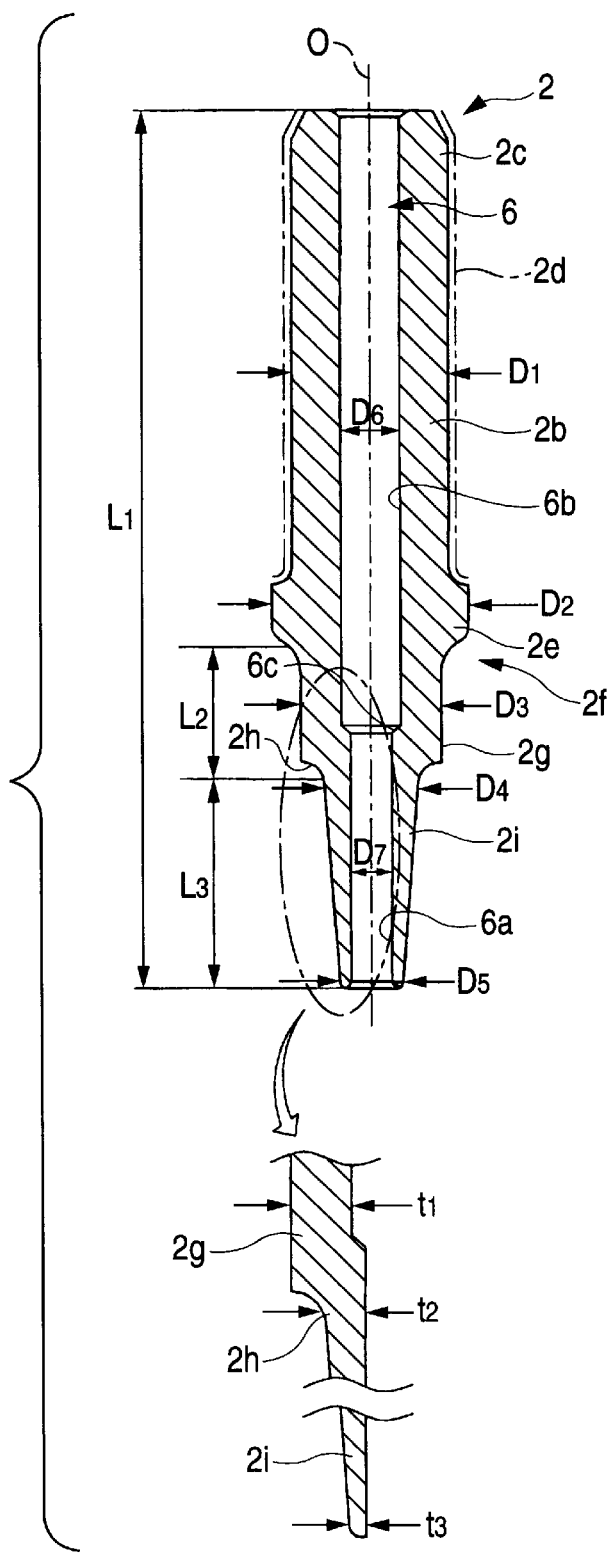
FIGS. 2A and 2B are longitudinal sectional views illustrating some examples of the insulator.

On the other hand, the center electrode 3 has a smaller diameter than the resistor 15. The through-hole 6 of the insulator 2 is divided into a nearly cylindrical first portion 6a into which the center electrode 3 has been inserted and a nearly cylindrical second portion 6b having a larger diameter than the first portion 6a and located on the rear side of the first portion 6a (on the upper side in the drawing). The terminal metal fixture 13 and the resistor 15 are disposed in the second portion 6b, while the center electrode 3 has been inserted into the first portion 6a. The center electrode 3 has, in its rear end part, an outward projection 3c for electrode fixing which protrudes from the circumference of the electrode 3. As shown in FIG. 2A, the first portion 6a and the second portion 6b of the through hole 6 are interconnected in the first front portion 2g. This connection part has a projection-receiving face 6c having a tapered or radiused surface for receiving the electrode-fixing projection 3c of the center electrode 3.

The insulator 2 has a stepped outer circumference at a connecting part 2h thereof where the first front portion 2g is connected to the second front portion 2i, while the meal shell 1 has a projection 1c formed on that part of its inner circumference which meets the insulator 2. The insulator 2 has been fitted into the metal shell 1 so that the stepped outer circumference of the insulator 2 meets the projection 1c through a ring-form sheet gasket 63 to thereby prevent the insulator 2 from slipping out in the axial direction. On the other hand, a ring-form wire gasket 62 is disposed between that part of the inner circumference of the metal shell 1 which is located near the rear-side opening thereof and that part of the outer circumference of the insulator 2 which is located just behind the flange-like projection part 2e. Furthermore, a ring-form wire gasket 60 is disposed on the rear side of the gasket 62 so that the space between the two gaskets 60 and 62 is filled with a filler layer 61, e.g., talc. The insulator 2 was pressed into the metal shell 1 toward the front side and, while keeping this state, the edge of the rear opening of the metal shell 1 was bent inward toward the gasket 60 to form a sealing lip 1d. Thus, the metal shell 1 has been secured to the insulator 2.

Figure 2B:
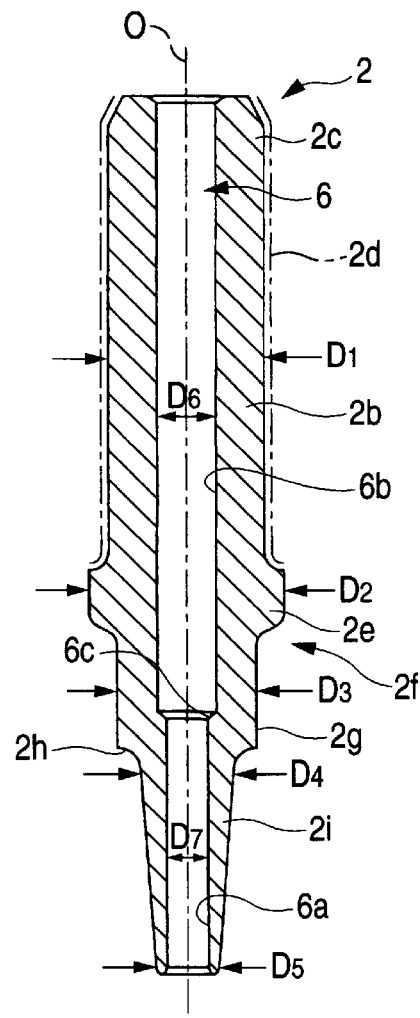

FIGS. 2A and 2B illustrate some examples of the insulator 2. The ranges of dimensions of the insulator and components thereof are shown below.

Total length, $L_1$: 30–75 mm;

Length of the first front portion 2g, $L_2$: 0–30 mm (exclusive of the connecting part 2f for connection to the projection part 2e, and inclusive of the connecting part 2h for connection to the second front portion 2i);

Length of the second front portion 2i, $L_3$: 2–27 mm;

Outer diameter of the rear portion 2b, $D_1$: 9–13 mm;

Outer diameter of the projection part 2e, $D_2$: 11–16 mm;

Outer diameter of the first front portion 2g, D: 5–11 mm;

Outer base diameter of the second front portion 2i, $D_4$: 3–8 mm;

Outer tip diameter of the second front portion 2i, $D_5$ (where the outer edge of the tip has been radiused or beveled, the outer diameter is measured at the base of the radiused or beveled part in a section containing the center axial line 0): 2.5–7 mm, Inner diameter of the second portion 6b of the through-hole 6, $D_6$: 2–5 mm;

Inner diameter of the first portion 6a of the through-hole 6, $D_7$: 1–3.5 mm;

Wall thickness of the first front portion 2g, $t_1$: 0.5–4.5 mm;

Wall thickness of the base part of the second front portion 2i, $t_2$ (the thickness in a direction perpendicular to the center axial line 0): 0.3–3.5 mm;

Wall thickness of the tip part of the second front portion 2i, $t_3$ (the thickness in a direction perpendicular to the center axial line 0; where the outer edge of the tip has been radiused or beveled, the thickness is measured at the base of the radiused or beveled part in a section containing the center axial line 0): 0.2–3 mm; and Average wall thickness of the second front portion 2i, $t_A$ $(=(t_2+t_3)/2)$: 0.25–3.25 mm.

In FIG. 1, that part 2k of the insulator 2 which projects on the rear side from the metal shell 1 has a length $L_Q$ of from 20 to 25 mm (e.g., about 23 mm).

As indicated by the dot-and-dash lines in FIG. 2, the insulator 2 has a glaze layer 2d formed on the surface thereof, more specifically, on the outer peripheral surface of the rear portion 2b. The surface roughness of that part of the glaze layer 2d which overlies the outer circumference of the rear portion 2b of the insulator 2 has been regulated to 10 μm or lower in terms of the Ry described above. The glaze layer 2d has a thickness of generally from 10 to 150 μm, preferably from 10 to 50 μm. Furthermore, the surface roughness of the underlying insulator 2 has been regulated to from 15 to 35 μm in terms of maximum height Ry. As shown in FIG. 1, the glaze layer 2d formed on the rear portion 2b extends so as to wholly cover the insulator circumference ranging in the axial direction from the rear edge of the projection part 2e to the rear edge of the rear portion 2b.

The glaze layer 2d has at least either of the compositions according to the first and second aspects of the invention described above. As the critical meaning of the range of the content of each component has been explained in detail, no repetition will be made here. That part of the glaze layer 2d which overlies the outer circumference of the insulator 2 ranging from the rear edge of the metal shell 1 over the length $L_Q$ of the projecting insulator rear portion 2b has a thickness $t_1$ (average) of from 10 to 50 μm.

The ground electrode 4 and the main body 3a of the center electrode 3 are made of a nickel alloy or the like. The center electrode 3 comprise this main body 3b and, embedded therein, a core 3b which is made of copper, a copper alloy, or the like and serves to accelerate heat dissipation. On the other hand, the ignition part 31 and the ignition part 32 opposed thereto are constituted mainly of a noble metal alloy based on one or more of iridium, platinum, and rhodium. The main body 3a of the center electrode 3 is reduced in diameter at a front end thereof and has a flat tip face. A disk chip made of the alloy constituting the ignition parts has been superposed on and bonded to that flat tip face to constitute the ignition part 31. This bonding was accomplished by forming a weld along the periphery of the joint by laser welding, electron beam welding, resistance welding, etc. The opposite ignition part 32 has been formed by positioning a chip on the ground electrode 4 so that the chip faces the ignition part 31 and then forming a weld along the periphery of the joint in the same manner to bond the chip. These chips each can be, for example, a material obtained by mixing alloying ingredients so as to result in the desired composition and melting the mixture. Alternatively, the chips can be a sinter obtained by compacting and sintering an alloy powder or a powder of elemental metals mixed in a given proportion. At least one of the ignition part 31 and the opposite ignition part 32 may be omitted.

The spark plug 100 described above can be produced, for example, by the following method. First, an insulator 2 is produced in the following manner. A raw alumina powder is mixed with raw material powders for a silicon component, calcium component, magnesium component, barium component, and boron component in such a proportion as to give the aforementioned composition in terms of oxides through baking. This powder mixture is mixed with given amounts of a binder (e.g., PVA) and water to prepare a base slurry for forming. The raw material powders to be incorporated may be, for example, an $SiO_2$ powder, $CaCO_3$ powder, MgO powder, $BaCO_3$ powder, and $H_3BO_3$ powder for a silicon component, calcium component, magnesium component, barium component, and boron component, respectively. The $H_3BO_3$ may be added in the form of a solution.

The base slurry for forming is spray-dried by the spray drying method or the like to obtain base granules for forming. The base granules are compacted with a rubber mold to obtain a compact as a green insulator. For this compaction is used a rubber mold having a cavity extending in the axis direction throughout the whole length thereof. A lower punch is fitted to the lower opening of the cavity. The lower punch has, integrally disposed on the punching side, a press pin which extends into the cavity along the axis thereof and determines the shape of the through-hole 6 of the insulator 2 to be formed.

This cavity is packed with a given amount of the base granules for forming, and the upper opening of the cavity is sealed with an upper punch. A hydraulic pressure is applied to the outer circumference of the rubber mold in that state to compress the granules in the cavity through the rubber mold and thereby obtain a compact. Before the base granules for forming are subjected to compaction, 0.7 to 1.3 parts by weight of water is added thereto per 100 parts by weight of the granules in order to facilitate disaggregation of the granules into powder particles during compaction. The outer circumference of the compact is processed with a grinder or the like so as to have a shape corresponding to the insulator 2. The compact is then baked at a temperature of from 1,400 to 1,600° C. to obtain the insulator 2.

On the other hand, a glaze slurry is prepared in the following manner.

First, raw material powders for silicon, aluminum, boron, zinc, barium, sodium, potassium, lithium, and other components (for example, an $SiO_2$ powder, $Al_2O$ powder, $H_3BO_3$ powder, ZnO powder, $BaCO_3$ powder, $Na_2CO_3$ powder, $K_2CO_3$ powder, and $Li_2CO_3$ powder for a silicon component, aluminum component, boron component, zinc component, barium component, sodium component, potassium component, and lithium component, respectively) are mixed together so as to obtain a given composition. This powder mixture is melted by heating at 1,000 to 1,500° C., and the melt is thrown into water to quench and vitrify it. The resultant glass is ground to obtain a glaze frit. This glaze frit is mixed with appropriate amounts of a clay mineral, e.g., kaolin or gairome clay, and an organic binder. Water is further added thereto, and the mixture is homogenized to obtain a glaze slurry.

The glaze slurry is sprayed from a spray nozzle on the given surface of the insulator 2 to form a glaze slurry coating layer as a glaze powder deposit layer. This coating layer is dried.

Subsequently, the fitting of a center electrode 3 and a terminal metal fixture 13 to the insulator 2 having the glaze slurry coating layer and the formation of a resistor 15 and conductive glass seal layers 16 and 17 are conducted roughly in the following manner. First, a center electrode 3 is inserted into the first portion 6a of the through-hole 6 of the insulator 2, and the remaining space of the through-hole 6 is filled with a conductive glass powder. A press bar is inserted into the through-hole 6 to preliminarily compress the powder and thereby form a first conductive glass powder layer. Subsequently, a raw material powder for a resistor composition is packed and preliminarily compressed in the same manner. Furthermore, a conductive glass powder is packed and preliminarily compressed. Thus, the first conductive glass powder layer, a resistor composition powder layer, and a second conductive glass powder layer are superposed in the through-hole 6 in this order from the center electrode 3 side (lower side).

A terminal metal fixture 13 is inserted from the upper side into the through-hole 6. The resultant assembly in this state is put into a heating oven and heated to a given temperature of from 800 to 950° C. which is not lower than the softening point of the glass. Thereafter, the terminal metal fixture 13 is forced into the through-hole 6 from the side opposite to the center electrode 3 so as to press the superposed layers in the axial direction. As a result, these layers are compressed and sintered to become a conductive glass seal layer 16, a resistor 15, and a conductive glass seal layer 17, respectively (the step described above is a glass sealing step)

In the case where the glaze frit contained in the glaze slurry coating layer is one regulated so as to have a softening point of from 600 to 700° C., this glaze slurry coating layer can be baked by the heating for the glass sealing step to form a glaze layer simultaneously. Since a relatively low temperature of from 800 to 950° C. is used for the heating in the glass sealing step, the surfaces of the center electrode 3 and terminal metal fixture 13 are less apt to oxidize.

A metal shell 1, a ground electrode 4, and other members are fitted to the assembly which has undergone the glass sealing step. Thus, the spark plug 100 shown in FIG. 1 is completed. The spark plug 100 is screwed into an engine block through the thread part 7 thereof and is used as a device for igniting an air/fuel mixture fed to the combustion chamber. A high-tension cable or an ignition coil is connected to the spark plug 100 by means of a rubber cap RC (comprising, e.g., a silicone rubber), which covers the outer circumference of the rear portion 2b of the insulator 2 as shown by dot-and-dash lines in FIG. 1. This rubber cap RC has an inner diameter smaller by about 0.5 to 1.0 mm than the outer diameter D, (FIG. 2) of the rear portion 2b. The rear portion 2b is forced into the rubber cap, while elastically expanding the hole of the cap, so that the rear portion 2b including its base portion is covered therewith. As a result, the inner surface of the rubber cap RC comes into tight contact with the outer circumference of the base portion of the rear portion 2b. Thus, the rubber cap RC functions as an insulating cover for preventing flashovers, etc. In addition, since the glaze layer 2d overlying the outer circumference of the base portion has been formed from a glaze having the composition described above and has a surface roughness regulated to a value within the range specified in the invention, the surface of the baked glaze layer has improved smoothness and shows a higher degree of tight contact with the rubber cap RC. Consequently, flashover-preventive properties can be improved. Furthermore, that part 2k of the insulator 2 which extends toward the rear side has no corrugations, and this also contributes to the enhancement of tightness of contact with the rubber cap RC. However, even when the glaze layer and the insulator described above are applied to a spark plug having corrugations like the spark plug shown in FIG. 3, the effect of enhancing the tightness of contact between the baked glaze layer surface and a rubber cap RC is likewise obtained due to the improved smoothness of the baked glaze layer surface, although there is a difference in the degree of this effect. In this case also, flashover-preventive properties canoe improved likewise.

The spark plugs of the invention are not limited to those of the type shown in FIG. 1. For example, they may be ones in which the tip of the ground electrode 4 faces a side of the center electrode 3 to form a spark gap g therebetween. Possible modifications of this constitution include a spark plug which has two ground electrodes 4 disposed respectively on both sides of the center electrode 3 and a spark plug which has three or more ground electrodes 4 disposed around the center electrode 3. Furthermore, the spark plug 100 can be constituted as a semi-creeping-discharge type spark plug in which the insulator 2 is disposed so that the front end thereof reaches to between a side of the center electrode 3 and the tip face of the ground electrode 4. Since a spark discharge in this constitution occurs along the surface of the front end of the insulator 2, this spark plug is less susceptible to fouling and damage than aerial-discharge type spark plugs.

Examples

The following experiments were carried out in order to ascertain the effects of the intention.

Insulators 2 were produced in the following manner. First, an alumina powder (alumina content, 95 mol %; sodium content (in terms of $Na_2O$), 0.1 mol %; average particle diameter, 3.0 μm) was mixed as a raw powder with $SiO_2$ (purity, 99.5%; average particle diameter, 1.5 μm), $CaCO_3$ (purity, 99.9%; average particle diameter, 2.0 μm), MgO (purity, 99.5%; average particle diameter, 2 μm), $BaCO_3$ (purity, 99.5%; average particle diameter, 1.5 μm), $H_3BO_4$ (purity, 99.0%; average particle diameter, 1.5 μm), and ZnO (purity, 99.5%; average particle diameter, 2.0 μm) as the other raw powders in each of given proportions. Thereto were added 3 parts by weight of PVA as a hydrophilic binder and 103 parts by weight of water per 100 parts by weight of the whole powder mixture. These ingredients were mixed together. Thus, base slurries for forming were prepared.

These slurries differing in composition each were spray-dried to prepare spherical base granules for forming, which were sieved to obtain a fraction of 50 to 100 μm. Each of these granular materials was compacted at a pressure of 50 MPa by the method of compaction with a rubber mold described above. The outer circumference of each resultant compact was processed with a grinder into a given insulator shape. The compacts were then baked at 1,550° C. to obtain insulators 2. X-ray fluorescence analysis revealed that these insulators 2 had the following composition.

Aluminum component in terms of $Al_2O_3$: 94.9 mol %

Silicon component in terms of $SiO_2$: 2.4 mol %

Calcium component in terms of CaO: 1.9 mol %

Magnesium component in terms of MgO: 0.1 mol %

Barium component in terms of BaO: 0.4 mol %

Boron component in terms of $B_2O_3$: 0.3 mol %

Figure 3:
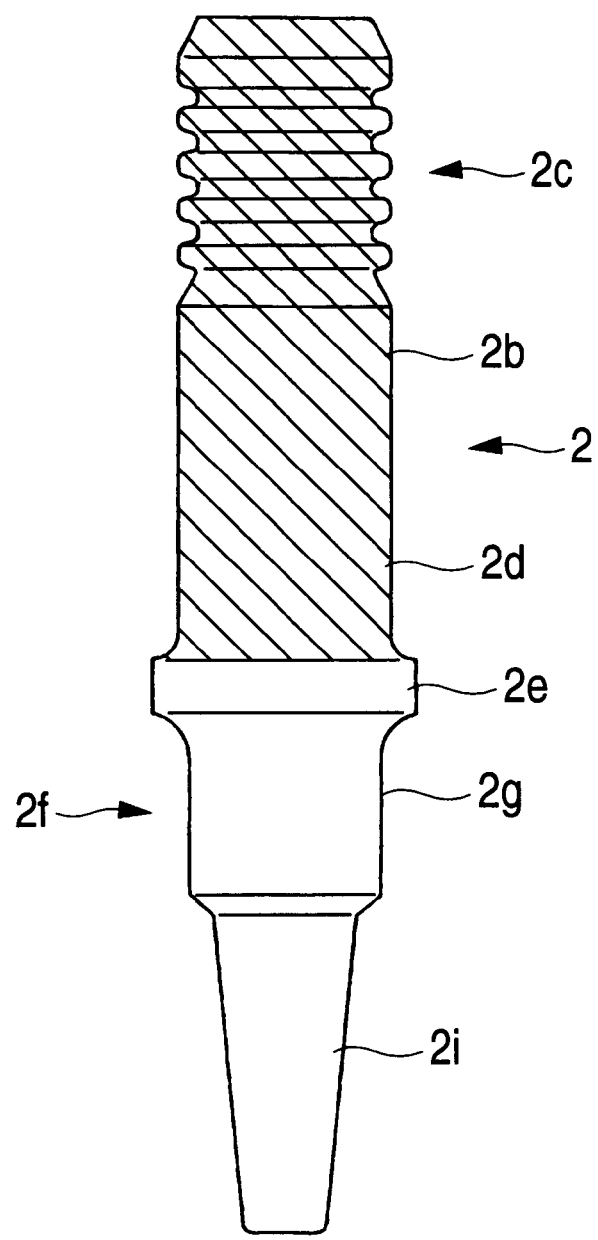
FIG. 3 is a view illustrating a spark plug having corrugations.

Those dimensions of each insulator 2 which are shown in FIG. 2A were as follows. $L_1$=ca. 60 mm, $L_2$=ca. 10 mm, $L_3$=ca. 14 mm, $D_1$=ca. 11 mm, $D_2$=ca. 13 mm, $D_3$=ca. 7.3 mm, $D_4$=5.3 mm, $D_5$=4.3 mm, $D_6$=3.9 mm, $D_7$=2.6 mm, $t_1$=3.3 mm, $t_2$=1.4 mm, $t_3$0.9 mm, and $t_4$=1.15 mm. Furthermore, the length $L_Q$ shown in FIG. 1, i.e., the length of that part 2k of the insulator 2 which projected on the rear side from the metal shell 1, was 23 mm. Insulators 2 having corrugations 2c as shown in FIG. 3 were also produced. Furthermore, insulators 2 having a smooth surface formed by tumbling were produced.

Next, glaze slurries were prepared in the following manner. First, an $SiO_2$ powder (purity, 99.5%), $Al_2O_3$ powder (purity, 99.5%), $H_3BO_3$ powder (purity, 98.5%), ZnO powder (purity, 99.5%), $BaCO_3$ powder (purity, 99.5%), $Na_2CO_3$ powder (purity, 99.5%), $K_2CO_3$ powder (purity, 99%), $Li_2CO_3$ powder (purity, 99%), $MoO_3$ powder (purity, 99%), $Fe_2O_3$ powder (purity, 99.0%), $WO_3$ powder (purity, 99%.), $ZrO_2$ powder (purity, 99.5%), $TiO_2$ powder (purity, 99.5%), $CaCO_3$ powder (purity, 99.8%), MgO powder (purity, 99.5T), $Sb_2O_6$ powder (purity, 99%), $Bi_2O_3$ powder (purity, 99%), and PbO powder (purity, 99%) were mixed together as raw materials in each of various proportions. The powder: mixtures were melted by heating at 1,000 to 1,500° C., and the melts were quenched in water and vitrified. Each resultant glass was ground with an alumina pot mill into particles of 50 μm or smaller to prepare a glaze frit. To 100 parts by weight of the glaze frit were added 3 parts by weight of New Zealand kaolin and 2 parts by weight of PVA as an organic binder, followed by 100 parts by weight of water. These ingredients were mixed together. Thus, glaze slurries were prepared.

Each of the glaze slurries was sprayed on insulators 2 from a spray nozzle and dried to form a glaze slurry coating layer. Other insulators 2 were immersed in each of the glaze slurries placed in respective vessels and were then pulled up to form a glaze coating layer thereon. The glaze coating layers thus formed had a thickness of about 100 μm after drying. These coated insulators 2 were used to produce various spark plugs 100 of the structure shown in FIG. 1 by the method described above. The outer diameter of the thread part 7 was 14 mm. For forming the resistor 15 were used a $B_2O_3$—$SiO_2$—BaO—$Li_2O$ glass powder, $ZrO_2$ powder, carbon black powder, $TiO_2$ powder, and metallic aluminum powder as raw material powders For forming the conductive glass seal layers 16 and 17 were used a $B_2O_3$—$SiO_2$—$Na_2O$ glass powder, copper powder, iron powder, and Fe-B powder as raw material powders. The heating temperature for the glass sealing, i.e, the glaze baking temperature, was 900° C.

On the other hand, glaze samples which had been not pulverized but solidified in block were also produced. These block glaze samples were ascertained to be in a vitrified (amorphous) state by X-ray diffractometry. These samples were examined for chemical composition by fluorescent X-ray analysis, and the found values (contents in terms of oxides) for each sample are shown in Tables 1 to 5. The glaze layer 2d formed on each insulator 2 was analyzed for composition by EPMA and, as a result, the results thus obtained were ascertained to be almost in agreement with the results of analysis of the corresponding block sample.

TABLE 1

|  | 1 | 2 | 3* | 4* | 5* | 6* |
|---|---|---|---|---|---|---|
| $SiO_2$ | 38.0 | 37.5 | 4.5 | 62.0 | 52.5 | 15.0 |
| $Al_2O_3$ | 3.0 | 3.0 | 4.0 | 3.0 | 3.0 | 1.0 |
| $B_2O_3$ | 25.0 | 25.0 | 48.0 | 10.0 | 2.0 | 53.0 |
| ZnO | 11.0 | 11.0 | 15.0 | 7.0 | 15.0 | 11.0 |
| BaO | 7.0 | 7.0 | 10.0 | 5.0 | 7.0 | 7.0 |
| $Na_2O$ | 1.5 | 1.5 | 2.5 | 1.5 | 3.0 | 1.5 |
| $K_2O$ | 5.0 | 5.0 | 5.0 | 5.0 | 5.0 | 5.0 |
| $Li_2O$ | 3.0 | 3.0 | 3.0 | 3.0 | 3.0 | 3.0 |
| $MoO_3$ | 1.0 | 1.0 |  |  | 1.0 | 1.0 |
| $Fe_2O_3$ | 0.5 | 0.5 |  |  | 0.5 | 0.5 |
| $WO_3$ |  |  |  |  |  |  |
| $ZrO_2$ | 1.5 | 1.5 | 2.0 | 1.5 | 2.0 | 1.5 |
| $TiO_2$ | 0.5 | 0.5 | 2.0 |  | 2.0 | 0.5 |
| CaO |  |  |  |  |  |  |
| MgO | 2.0 | 2.0 | 4.0 | 2.0 | 3.0 |  |
| $Sb_2O_3$ | 1.0 | 1.0 |  |  | 1.0 |  |
| $Bi_2O_3$ |  | 0.5 |  |  |  |  |
| PbO |  |  |  |  |  |  |
| Si + B | 63.0 | 62.5 | 52.5 | 72.0 | 54.5 | 68.0 |
| Zn + RO | 18.0 | 18.0 | 25.0 | 12.0 | 22.0 | 18.0 |
| Si + B + Zn + RO | 81.0 | 80.5 | 77.5 | 84.0 | 76.5 | 86.0 |
| $R_2O$ | 9.5 | 9.5 | 10.5 | 9.5 | 11.0 | 9.5 |
| Zn + Ba | 18.0 | 18.0 | 25.0 | 12.0 | 22.0 | 18.0 |
| Total | 100 | 100 | 100 | 100 | 100 | 100 |

(unit, mol %; Symbol * indicates that the glaze is outside the scope of the invention.)

TABLE 2

|  | 7* | 8* | 9* | 10 | 11 | 12* |
|---|---|---|---|---|---|---|
| $SiO_2$ | 20.0 | 53.0 | 39.0 | 39.0 | 39.0 | 41.0 |
| $Al_2O_3$ | 4.5 | 0.5 | 3.0 | 3.0 | 3.0 | 3.0 |
| $B_2O_3$ | 13.0 | 28.0 | 32.0 | 32.0 | 32.0 | 32.0 |
| ZnO | 17.0 | 7.0 | 6.5 | 6.5 | 6.5 | 5.0 |
| BaO | 10.0 | 5.0 | 4.0 | 4.0 | 4.0 | 3.5 |
| $Na_2O$ | 2.0 | 0.5 | 1.5 | 1.5 | 1.5 | 1.5 |
| $K_2O$ | 6.0 | 4.0 | 5.0 | 5.0 | 5.0 | 5.0 |
| $Li_2O$ | 4.0 | 2.0 | 3.0 | 3.0 | 3.0 | 3.0 |
| $MoO_3$ | 1.0 |  | 1.0 | 1.0 | 1.0 | 1.0 |
| $Fe_2O_3$ | 0.5 |  | 0.5 | 0.5 | 0.5 | 0.5 |
| $ZrO_2$ | 2.0 |  | 1.0 | 1.0 | 1.0 | 1.0 |

TABLE 2-continued

|  | 7* | 8* | 9* | 10 | 11 | 12* |
|---|---|---|---|---|---|---|
| $TiO_2$ | 2.0 |  | 0.5 | 0. | 0.5 | 0.5 |
| CaO | 12.0 |  |  |  |  |  |
| MgO | 5.0 |  | 3.0 | 2.0 | 2.5 | 2.0 |
| $Sb_2O_3$ | 1.0 |  |  |  | 0.5 |  |
| $Bi_2O_3$ |  |  |  | 1.0 |  | 1.0 |
| PbO |  |  |  |  |  |  |
| Si + B | 33.0 | 81.0 | 71.0 | 71.0 | 71.0 | 73.0 |
| Zn + RO | 39.0 | 12.0 | 10.5 | 10.5 | 10.5 | 8.5 |
| Si + B + Zn + RO | 72.0 | 93.0 | 81.5 | 81.5 | 81.5 | 81.5 |
| $R_2O$ | 12.0 | 6.5 | 9.5 | 9.5 | 9.5 | 9.5 |
| Zn + Ba | 27.0 | 12.0 | 10.5 | 10.5 | 10.5 | 8.5 |
| Total | 100 | 100 | 100 | 100 | 100 | 100 |

(unit, mol %; Symbol * indicates that the glaze is outside the scope ot the invention.)

TABLE 3

|  | 13* | 14* | 15* | 16* | 17* | 18* |
|---|---|---|---|---|---|---|
| $SiO_2$ | 36.5 | 23.0 | 28.0 | 51.5 | 42.0 | 32.0 |
| $Al_2O_3$ | 1.0 | 1.0 | 4.0 | 0.5 | 3.0 | 3.0 |
| $B_2O_3$ | 32.0 | 12.0 | 22.0 | 23.0 | 27.0 | 25.0 |
| ZnO | 6.5 | 17.0 | 8.0 | 15.0 | 13.0 | 11.0 |
| BaO | 4.0 | 12.0 | 5.0 | 9.0 | 7.0 | 7.0 |
| $Na_2O$ | 1.5 | 0.5 | 3.0 |  |  | 3.0 |
| $K_2O$ | 5.0 | 1.0 | 7.0 | 0.5 | 0.5 | 9.0 |
| $Li_2O$ | 3.0 | 0.5 | 4.0 | 0.5 | 1.0 | 4.0 |
| $MoO_3$ | 1.0 |  | 1.0 |  | 1.0 | 1.0 |
| $Fe_2O_3$ | 0.5 |  | 1.0 |  | 0.5 |  |
| $WO_3$ |  |  | 1.0 |  |  |  |
| $ZrO_2$ | 1.0 | 1.0 | 3.0 |  | 1.5 | 1.5 |
| $TiO_2$ | 0.5 |  | 2.0 |  | 0.5 | 0.5 |
| CaO |  | 32.0 |  |  |  |  |
| MgO | 2.0 |  | 10.0 |  | 2.0 | 2.0 |
| $Sb_2O_3$ |  |  | 1.0 |  | 1.0 | 1.0 |
| $Bi_2O_3$ | 5.5 |  |  |  |  |  |
| PbO |  |  |  |  |  |  |
| Si + B | 68.5 | 35.0 | 50.0 | 74.5 | 69.0 | 57.0 |
| Zn + RO | 10.5 | 61.0 | 13.0 | 24.0 | 20.0 | 18.0 |
| Si + B + Zn + RO | 79.0 | 96.0 | 63.0 | 98.5 | 89.0 | 75.0 |
| $R_2O$ | 9.5 | 2.0 | 14.0 | 1.0 | 1.5 | 16.0 |
| Zn + Ba | 10.5 | 29.0 | 13.0 | 24.0 | 20.0 | 18.0 |
| Total | 100 | 100 | 100 | 100 | 100 | 100 |

(unit, mol %; Symbol * indicates that the glaze is outside the scope ot the invention.)

TABLE 4

|  | 19* | 20* | 21* | 22 | 23 | 24 |
|---|---|---|---|---|---|---|
| $SiO_2$ | 40.0 | 30.0 | 29.0 | 41.0 | 34.0 | 42.0 |
| $Al_2O_3$ | 3.0 | 2.0 | 2.0 |  | 7.0 | 3.0 |
| $B_2O_3$ | 27.0 | 20.0 | 20.0 | 25.0 | 25.0 | 25.0 |
| ZnO | 5.0 | 20.0 | 20.0 | 11.0 | 11.0 | 4.0 |
| BaO | 4.0 | 15.0 | 15.0 | 7.0 | 7.0 | 11.0 |
| $Na_2O$ | 1.5 | 1.5 | 1.5 | 1.5 | 1.5 | 3.0 |
| $K_2O$ | 5.0 | 5.0 | 5.0 | 5.0 | 5.0 | 7.0 |
| $Li_2O$ | 3.0 | 3.0 | 3.0 | 3.0 | 3.0 | 5.0 |
| $MoO_3$ | 1.0 | 1.0 | 1.0 | 1.0 | 1.0 |  |
| $Fe_2O_3$ | 0.5 | 0.5 | 0.5 | 0.5 | 0.5 |  |
| $WO_3$ |  |  |  |  |  |  |
| $ZrO_2$ | 2.0 | 2.0 | 2.0 | 1.5 | 1.5 |  |
| $TiO_2$ |  |  |  | 0.5 | 0.5 |  |
| CaO | 5.0 |  |  |  |  |  |
| MgO | 3.0 |  |  | 3.0 | 3.0 |  |
| $Sb_2O_3$ |  |  |  |  |  |  |
| $Bi_2O_3$ |  |  | 1.0 |  |  |  |
| PbO |  |  |  |  |  |  |
| Si + B | 67.0 | 50.0 | 49.0 | 66.0 | 59.0 | 67.0 |
| Zn + RO | 14.0 | 35.0 | 35.0 | 18.0 | 18.0 | 15.0 |
| Si + B + Zn + RO | 81.0 | 85.0 | 84.0 | 84.0 | 77.0 | 82.0 |
| $R_2O$ | 9.5 | 9.5 | 9.5 | 9.5 | 9.5 | 15.0 |

TABLE 4-continued

|  | 19* | 20* | 21* | 22 | 23 | 24 |
|---|---|---|---|---|---|---|
| Zn + Ba | 9.0 | 35.0 | 35.0 | 18.0 | 18.0 | 15.0 |
| Total | 100 | 100 | 100 | 100 | 100 | 100 |

(unit, mol %; Symbol * indicates that the glaze is outside the scope of the invention.)

TABLE 5

|  | 25 | 26 | 27 | 28 | 29* | 30 | 31 |
|---|---|---|---|---|---|---|---|
| $SiO_2$ | 51.5 | 25.0 | 41.0 | 37.2 | 38.0 | 38.0 | 38.0 |
| $Al_2O_3$ | 1.0 | 2.0 | 3.0 | 3.0 | 2.0 | 3.0 | 3.0 |
| $B_2O_3$ | 23.0 | 45.0 | 28.0 | 31.0 | 23.0 | 25.0 | 25.0 |
| ZnO | 4.0 | 4.0 | 11.0 | 11.0 | 4.0 | 11.0 | 11.0 |
| BaO | 11.0 | 8.0 | 7.0 | 7.0 |  |  | 3.5 |
| SrO |  |  |  |  |  | 7.0 | 3.5 |
| $Na_2O$ |  | 1.2 | 1.5 | 1.5 | 3.0 | 1.5 | 1.5 |
| $K_2O$ | 5.0 | 4.0 | 5.0 | 5.0 | 3.0 | 5.0 | 5.0 |
| $Li_2O$ | 1.0 | 2.0 |  |  | 2.0 | 3.0 | 3.0 |
| $MoO_3$ |  |  | 1.0 | 1.0 |  | 1.0 | 1.0 |
| $Fe_2O_3$ |  |  | 0.5 | 0.5 |  | 0.5 | 0.5 |
| $WO_3$ | 1.5 |  |  |  |  |  |  |
| $ZrO_2$ |  | 3.0 | 1.5 | 1.5 |  | 1.5 | 1.5 |
| $TiO_2$ |  |  | 0.5 | 0.5 |  | 0.5 | 0.5 |
| CaO | 2.0 | 2.0 |  |  |  |  |  |
| MgO |  | 3.0 |  |  |  | 2.0 | 2.0 |
| $Sb_2O_3$ |  |  |  |  |  | 1.0 | 1.0 |
| $Bi_2O_3$ |  |  |  | 0.8 |  |  |  |
| PbO |  | 0.8 |  |  | 28.0 |  |  |
| Si + B | 74.5 | 70.0 | 69.0 | 68.2 | 61.0 | 63.0 | 63.0 |
| Zn + RO | 17.0 | 14.0 | 18.0 | 18.0 | 4.0 | 18.0 | 18.0 |
| Si + B + Zn + RO | 91.5 | 84.0 | 87.0 | 86.2 | 65.0 | 81.0 | 81.0 |
| $R_2O$ | 6.0 | 7.2 | 6.5 | 6.5 | 5.0 | 9.5 | 9.5 |
| Zn + (Ba/Sr) | 15.0 | 12.0 | 18.0 | 18.0 | 4.0 | 18.0 | 18.0 |
| Total | 100 | 100 | 100 | 100 | 100 | 100 | 100 |

(unit, mol %; Symbol * indicates that the glaze is outside the scope of the invention.)

The surface roughness of that part of the glaze layer 2d which overlay the outer circumference of the base portion of each insulator 2 was measured in terms of maximum height Ry by the method as provided for in JIS B0601. For the measurement was used a non-contact three-coordinate measuring apparatus (NH-3) manufactured by Mitaka Koki Co, Ltd. Furthermore, the thickness of that part of the glaze layer 2d which overlay the outer circumference of the base portion of each insulator 2 was measured through examination of a section thereof with an SEM.

Each spark plug was further examined for insulation resistance at 500° C. and an applied voltage of 1,000 V by the method described hereinabove. Furthermore, each spark plug was evaluated for flashover-preventive property in the following manner. The front side of the insulator 2 was covered with a silicone tube or the like in order to prevent a discharge occurring on the spark gap g side. This spark plug 100 was attached to a pressure chamber. A rubber cap RC made of a silicone rubber was put on the rear portion 2b of the insulator 2 as shown in FIG. 1, and a high-tension cable insulated with PVC or the like was connected to the terminal metal fixture 13. A voltage was applied through the high-tension cable to the spark plug 100 kept in that state, and the applied voltage was increased at a rate of from 0.1 to 1.5 kV/sec to determine the critical voltage for flashover occurrence, i.e., the lowest voltage at which a flashover occurs. The spark plugs having a critical voltage higher than 30 kV were rated as excellent (○), those having a critical voltage of from 25 to 30 kv as good (Δ), and those having a critical voltage lower than 25 kv as poor (X) The results of the above evaluations are shown in Tables 7 to 10. The measurement of insulation resistance described above was repeated after the evaluation of flashover-preventive property.

TABLE 6

| No. | 1 | 2 | 3 | 4* | 5 | 6 | 7 | 8 | 9 |
|---|---|---|---|---|---|---|---|---|---|
| Composition of leadless glaze | 1 | 1 | 2 | 24 | 1 | 1 | 2 | 3* | 4* |
| Corrugations | none | present | none | none | none | none | none | none | none |
| Surface roughness, Ry (μm) (peak-to-valley distance) | 3.0 | 3.0 | 4.0 | 15 | 2.5 | 15 | 2.0 | 20 | 9.0 |
| Glaze layer thickness | 30 | 30 | 5 | 5 | 80 | 40 | 30 | 40 | 30 |
| Hot insulation resistance of glaze layer (MΩ) | 1000 | 1100 | 1100 | 1000 | 600 | 1000 | 1000 | 600 | 2000 |
| Flashover voltage (kV) | 38 | 28 | 28 | 22 | 30 | 22 | 38 | 20 | 36 |
| Appearance of baked glaze | ◉ | ◉ | ◉ | ◉ | ◉ | ◉ | ◉ | X (crimping) | X (insufficient melting) |
| Remarks | | | insulator tumbling | no insulator tumbling | poor cap removability | immersion in glaze bath | | | |
| Judgment: | ◉ | ○ | ○ | X | ○ | X | ◉ | X | X |

(Symbol * indicates that the glaze (or sample) is outside the scope of the invention.)

TABLE 7

| No. | 10 | 11 | 12 | 13 | 14 | 15 | 16 | 17 | 18 |
|---|---|---|---|---|---|---|---|---|---|
| Composition of leadless glaze | 5* | 6* | 7* | 8* | 9* | 10 | 11 | 12* | 13* |
| Corrugations | none | none | none | none | none | none | none | none | none |
| Surface roughness, Ry (μm) (peak-to-valley distance) | 8.0 | 11 | 13 | 9.0 | 8.0 | 6.0 | 6.0 | 8.0 | 6.0 |
| Glaze layer thickness (μM) | 40 | 80 | 60 | 30 | 40 | 30 | 30 | 40 | 30 |
| Hot insulation resistance of glaze layer (MΩ) | 2000 | 100 | 300 | 2000 | 1800 | 1800 | 1800 | 2000 | 1800 |
| Flashover voltage (kV) | 34 | 22 | 24 | 32 | 30 | 30 | 30 | 32 | 30 |
| Appearance of baked glaze | X (insufficient melting) | Δ (devitrification) | X (crimping) | X (insufficient melting) | X (insufficient melting) (crazing) | ◉ | ◉ | X (insufficient melting) (crazing) | X colored (red-brown) |
| Remarks | | water resistance; poor | | | | | | | |
| Judgement | X | X | X | X | X | ○ | ○ | X | X |

(Symbol * indicates that the glaze is outside the scope of the invention.)

TABLE 8

| No. | 19 | 20 | 21 | 22 | 23 | 24 | 25 | 26 | 27 |
|---|---|---|---|---|---|---|---|---|---|
| Composition of leadless glaze | 14* | 15* | 16* | 17* | 18* | 19* | 20* | 21* | 22 |
| Corrugations | none | none | none | none | none | none | none | none | none |
| Surface roughness, Ry ($\mu$m) (peak-to-valley distance) | 7.0 | 6.0 | 8.0 | 9.0 | 3.0 | 8.0 | 7.0 | 6.5 | 3.0 |
| Glaze layer thickness ($\mu$m) | 55 | 40 | 40 | 30 | 30 | 40 | 60 | 60 | 30 |
| Hot insulation resistance of glaze layer (M$\Omega$) | 200 | 100 | 2000 | 3000 | 50 | 2000 | 150 | 150 | 1000 |
| Flashover voltage (kV) | 24 | 20 | 34 | 36 | 20 | 34 | 22 | 22 | 38 |
| Appearance of baked glaze | Δ (devitrification) | X (crimping) | X (insufficient melting) | X (insufficient melting) | ⊙ | X (insufficient melting) (crazing) | X (devitrification) | X (devitrification) | ○ (reduced clarity) |
| Remarks | | | | | | | | | |
| Judgement | X | X | X | X | X | X | X | X | ○ |

(Symbol * indicates that the glaze is outside the scope of the invention.)

TABLE 9

| No. | 28 | 29 | 30 | 31 | 32 | 33 | 34 | 35 | 36 | 37 |
|---|---|---|---|---|---|---|---|---|---|---|
| Composition of leadless glaze | 23 | 24 | 25 | 26 | 27 | 28 | 29* | 29* | 30 | 31 |
| Corrugations | none | none | none | none | none | none | none | present | none | none |
| Surface roughness, Ry ($\mu$m) (peak-to-valley distance) | 4.0 | 1.0 | 7.0 | 2.5 | 9.5 | 7.0 | 3.0 | 3.0 | 3.0 | 3.0 |
| Glaze layer thickness ($\mu$m) | 30 | 20 | 40 | 50 | 30 | 30 | 40 | 40 | 30 | 30 |
| Hot insulation resistance of glaze layer (M$\Omega$) | 1200 | 800 | 1200 | 900 | 1300 | 1300 | 1100→300 | 1200→350 | 1000 | 1000 |
| Flashover voltage (kV) | 38 | >40 | 30 | 31 | 28 | 30 | 20 | 18 | 38 | 38 |
| Appearance of baked glaze | Δ (insufficient melting) | ⊙ | ⊙ | ⊙ | ⊙ | ⊙ | ⊙ | ⊙ | ⊙ | ⊙ |
| Remarks | | | | | | | | | | |
| Judgement | ○ | ○ | ○ | ○ | ○ | ○ | X | X | ⊙ | ⊙ |

(Symbol * indicates that the glaze is outside the scope of the invention.)

The results given above show that regulating the glaze layer so as to have a surface roughness of 10 $\mu$m or lower in its part overlying the outer circumference of the base portion of the rear portion 2*b* was effective in improving the tightness of contact between the rubber cap and the insulator and in thereby improving flashover voltage.

The spark plug of Experiment No. 2 shown in Table 6 had a higher insulation resistance than that of Experiment No. 1 because of the increased distance due to corrugations. However, the former spark plug showed a lower degree of tightness of contact and a slightly lower flashover voltage because of the corrugations. The spark plug of Experiment No. 3 had a maximum height Ry, indicating surface roughness, as small as 4.0 μm despite the small glaze layer thickness of 5 μm, because the surface of the underlying insulator 2 had been smoothened by tumbling. This spark plug hence had a satisfactory flashover voltage. In contrast, the spark plug of Experiment No. 4, which had been produced in the same manner except that tumbling was omitted and which had a glaze layer thickness as small as 5 μm, had a maximum height Ry, indicating surface roughness, as large as 15 μm and showed a poor flashover voltage.

The spark plug of Experiment No. 5 had slight difficulty in cap removal and showed slightly reduced tightness of contact, because the glaze layer was thick. This spark plug hence showed a slightly reduced insulation resistance. The spark plug of Experiment No. 6 had unevenness of glaze layer thickness and hence an increased surface roughness, because the glaze slurry had been applied not by spraying but by immersion in a glaze slurry bath. Consequently, this spark plug showed a poor flashover voltage.

The spark plug of Experiment No. 32 shown in Table 9, in which the glaze layer contained no lithium component as an alkali metal component, and that of Experiment No. 33, in which the glaze layer contained alkali metal components including a small proportion of a lithium component, had higher surface roughnesses and lower flashover voltages than the spark plugs of other Experiments in which the proportion of a lithium component in the alkali metal components was in the range of from 0.2 to 0.5. Incidentally, the spark plugs of Experiments Nos. 34 and 35 changed in insulation resistance through the examination with voltage application because of the high lead component content. Specifically, these spark plugs each showed a distinct decrease in insulation voltage through the examination for flashover-preventive property. These two spark plugs further had a poor flashover voltage. In Table 9, in the row "Insulation Resistance" for each of Experiments Nos. 34 and 35, the numeral preceding the arrow indicates the value of insulation resistance before that examination, while the numeral following it indicates the value of insulation after the examination.

Figure 4:
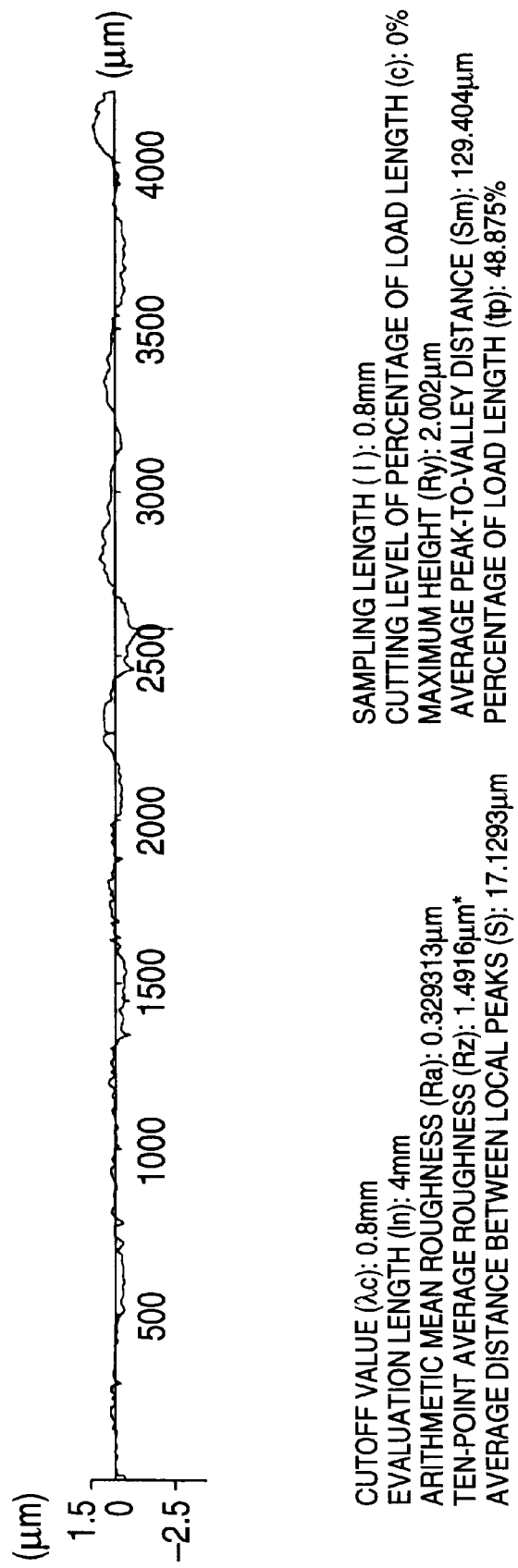
FIG. 4 is a presentation showing a surface roughness curve of a glazed sample.
Figure 5:
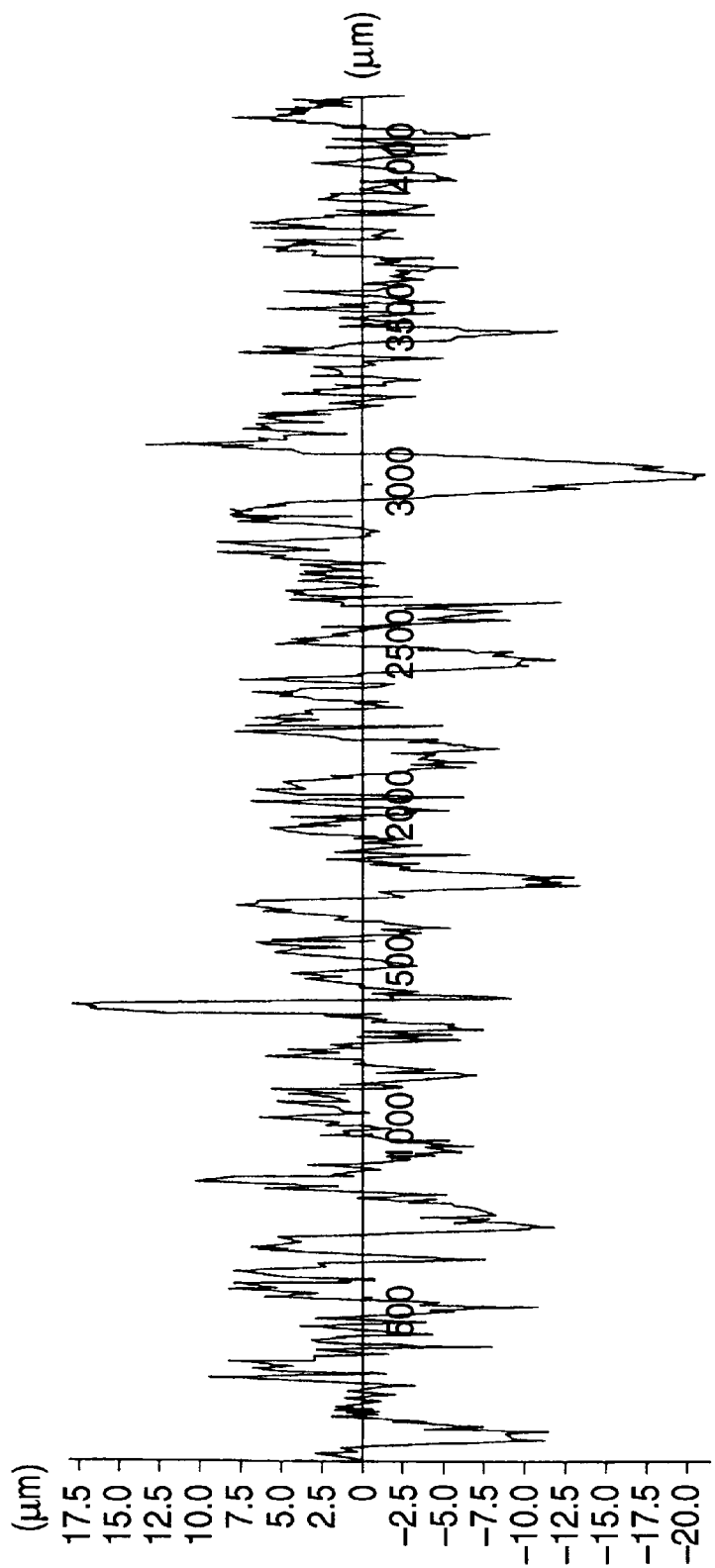
FIG. 5 is a presentation showing a surface roughness curve of an unglazed sample.

FIGS. 4 and 5 show surface roughness curves of a glazed sample and an unglazed sample, respectively, in Experiment No. 6; the roughness curves were obtained by the method as provided for in JIS B 0601. A comparison between FIG. 4, showing the roughness curve for a glazed sample, and FIG. 5, showing the roughness curve for an unglazed sample, indicates that the glazed surface had a reduced peak-to-bottom distance and had been clearly smoothened. In FIGS. 4 and 5 are further shown conditions for roughness curve determination (cutoff value, evaluation length, sampling length, and cutting level of percentage of load length) and various roughness parameters calculated from each roughness curve based on the definitions given in JIS B 0601 (arithmetic mean roughness Ra, maximum height Ry, ten-point average roughness Pz, average peak-to-valley distance Sm, average distance between local peaks S, and percentage of load length tp).

This application is based on Japanese patent applications JP 2000-299379, filed Sep. 29, 2000, and JP 2001-195247, filed Jun. 27, 2001, the entire contents of each of which are hereby incorporated by reference, the same as if set forth at length.

What is claimed is:

1. A spark plug comprising: a center electrode; a metal shell; and an insulator comprising an alumina ceramic and disposed between the electrode and the shell, wherein at least part of the surface of the insulator is covered with a glaze layer, the glaze layer contains a lead component content of 1 mol % or lower of PbO, the glaze layer comprises: 35 to 80 mol % of a first ingredient comprising 5 to 60 mol % of silicon component $SiO_2$ and 3 to 50 mol % of boron component $B_2O_3$; and 12 to 60 mol % of a second ingredient comprising at least one of a zinc component ZnO and an alkaline earth metal component R, in which R is at least one selected from the group consisting of calcium, strontium, and barium, of ZnO and empirical formula RO, respectively, the total content of the first ingredient and the second ingredient is from 65 to 98 mol %, the total content of the zinc component ZnO and at least one of the barium component BaG and strontium component SrO is from 12 to 30 mol %, the glaze layer further contains at least one alkali metal component selected from the group consisting of sodium, potassium and lithium in a total amount of from 2 to 15 mol % of $Na_2O$, $K_2O$, and $Li_2O$, respectively, the insulator includes, in an axially central position thereof, a projection part protruding from the outer circumferential surface thereof and extending in a circumferential direction, the insulator includes a main body located adjacent to the projection part on the rear side thereof, which is the side opposite to the front side facing the center electrode in the axial direction, and the main body of the insulator includes a base portion having a cylindrical outer circumference, and the outer circumference of the base portion is covered with the glaze layer which gives a surface roughness curve having a maximum height Ry of 10 μm or smaller, wherein the insulator gives a surface roughness curve having a maximum height Ry of 15 to 35 μm, and the glaze layer has thickness of from 10 to 50 μm.

2. A spark plug comprising: a center electrode; a metal shell; and an insulator comprising an alumina ceramic and disposed between the electrode and the shell, wherein at least part of the surface of the insulator is covered with a glaze layer, the glaze layer contains a lead component content of 1 mol % or lower of PbO, the glaze layer comprises: 35 to 80 mol % of a first ingredient comprising 5 to 60 mol % of silicon component $SiO_2$ and 3 to 50 mol % of boron component $B_2O_3$; and 10 to 60 mol % of a second ingredient comprising at least one of a zinc component ZnO and an alkaline earth metal component R, in which R is at least one selected from the group consisting of calcium, strontium and barium, in terms of ZnO and empirical formula RO, respectively, the total content of the first ingredient and the second ingredient is from 65 to 98 mol %, the total content of the zinc component ZnO and at least one of the barium component BaO and strontium component SrO is from 10 to 30 mol %, the glaze layer further contains at least one of bismuth and antimony as a fluidity-improving ingredient in a total amount of from 0.5 to 5 mol % of $Bi_2O_3$ and $Sb_2O_3$, respectively, the glaze layer furthermore contains at least one alkali metal component selected from the group consisting of sodium, potassium, and lithium in a total amount of from 2 to 15 mol % of $Na_2O$, $K_2O$, and $Li_2O$, respectively, the insulator includes, in an axially central position thereof, a projection part protruding from the outer circumferential surface thereof and extending in a circumferential direction, the insulator includes a main body located adjacent to the projection part on the rear side thereof, which is the side opposite to the front side facing the center electrode in the axial direction, and the main body of the insulator includes a base portion having a cylindrical outer circumference, and the outer circumference of the base portion is covered with the glaze layer which gives a surface roughness curve having a maximum height Ry of 10 $\mu$m or smaller.

3. The spark plug according to claim 1, wherein the main body of the insulator has no corrugations on the outer circumference in a rear end part thereof.

4. The spark plug according to claim 2, wherein the main body of the insulator has no corrugations on the outer circumference in a rear end part thereof.

5. The spark plug according to claim 1, wherein the glaze layer contains a lithium component as the alkali metal component.

6. The spark plug according to claim 2, wherein the glaze layer contains a lithium component as the alkali metal component.

7. The spark plug according to claim 5, wherein the glaze layer contains a lithium component in such an amount that $NLi_2O/NR_2O$ is from 0.2 to 0.5, provided that $NLi_2O$ is the molar content of the lithium component $Li_2O$ and $NR_2O$ is the total molar content of at least two alkali metal components R, of empirical formula $R_2O$, including lithium and at least one of sodium and potassium.

8. The spark plug according to claim 6, wherein the glaze layer contains a lithium component $Li_2O$ in such an amount that $NLi_2O/NR_2O$ is from 0.2 to 0.5, provided that $NLi_2O$ is the molar content of the lithium component $Li_2O$ and $NR_2O$ is the total molar content of at least two alkali metal components R, of empirical formula $R_2O$, including lithium and at least one of sodium and potassium.

9. The spark plug according to claim 1, wherein the glaze layer contains an aluminum component in an amount of from 0.1 to 5 mol % of $Al_2O_3$.

10. The spark plug according to claim 2, wherein the glaze layer contains an aluminum component in an amount of from 0.1 to 5 mol % of $Al_2O_3$.

11. The spark plug according to claim 2, wherein the glaze layer has a thickness of from 10 to 50 $\mu$m.

* * * * *